US012582990B2

(12) United States Patent　　(10) Patent No.:　US 12,582,990 B2
Shih et al.　　　　　　　　　　　(45) Date of Patent:　Mar. 24, 2026

(54) INTEGRATED DROPLET-DIGITAL MICROFLUIDIC SYSTEM FOR ON-DEMAND DROPLET CREATION, MIXING, INCUBATION, AND SORTING OF DROPLETS IN A CELL TRAPPING ARRAY

(71) Applicants:Steve Shih, Montreal (CA); Kenza Samlali, Montreal (CA); Fatemeh Ahmadi, Montreal (CA)

(72) Inventors: Steve Shih, Montreal (CA); Kenza Samlali, Montreal (CA); Fatemeh Ahmadi, Montreal (CA)

( * ) Notice:　Subject to any disclaimer, the term of this patent is extended or adjusted under 35 U.S.C. 154(b) by 0 days.

(21) Appl. No.: 18/523,035

(22) Filed:　Nov. 29, 2023

(65) Prior Publication Data

US 2024/0326050 A1　Oct. 3, 2024

Related U.S. Application Data

(63) Continuation of application No. 17/771,802, filed as application No. PCT/CA2020/051428 on Oct. 23, 2020, now abandoned.

(60) Provisional application No. 63/041,714, filed on Jun. 19, 2020, provisional application No. 62/926,134, filed on Oct. 25, 2019.

(51) Int. Cl.
　　*B01L 3/00*　　　(2006.01)
　　*G01N 15/10*　　(2024.01)
　　*G01N 15/14*　　(2024.01)
　　*G01N 15/149*　　(2024.01)
(52) U.S. Cl.
　　CPC .... *B01L 3/502761* (2013.01); *G01N 15/1484* (2013.01); *B01L 2200/0652* (2013.01); *B01L 2300/0645* (2013.01); *B01L 2300/0838* (2013.01); *B01L 2300/0883* (2013.01); *B01L*
*2300/165* (2013.01); *B01L 2400/0424* (2013.01); *G01N 2015/1006* (2013.01); *G01N 15/149* (2024.01)

(58) Field of Classification Search
　　CPC ....... B01L 3/502761; B01L 2200/0652; B01L 2300/0645; B01L 2300/0838; B01L 2300/165; B01L 2400/0424; B01L 3/502715; B01L 3/502792; B01L 2200/027; B01L 2300/0883; B01L 2300/0867; B01L 3/50273; B01L 3/502784; G01N 15/1484; G01N 2015/1006; G01N 2015/149; G01N 2021/0346; C12M 23/16; C12M 25/01
　　See application file for complete search history.

(56)　　　　　References Cited

U.S. PATENT DOCUMENTS

2017/0043343 A1*　2/2017　Khandros .............. C12M 23/20

OTHER PUBLICATIONS

Ahmadi et al. "An integrated droplet-digital microfluidic system for on-demand droplet creation, mixing, incubation, and sorting" Lab Chip, 2019, 19, 524-535 (Year: 2019).*

(Continued)

*Primary Examiner* — Dean Kwak
(74) *Attorney, Agent, or Firm* — Stephen Leonard; Aird & McBurney LP

(57)　　　　　ABSTRACT

Microfluidic devices, systems and methods are described herein. The devices, systems and methods provide for trapping particles, including cells. Methods of generating a droplet in a microfluidic device and collecting droplets from microfluidic devices are also disclosed herein.

18 Claims, 45 Drawing Sheets

(56) References Cited

OTHER PUBLICATIONS

Duan et al., High spatial efficiency single-particle trapping array based on a microfluidic device, 2019 IOP Conf. Ser.: Mater. Sci. Eng. 563 032044, DOI 10.1088/1757-899X/563/3/032044 (Year: 2019).*

Ou et al., Single-cell analysis with microfluidic devices. Anal. Sci. 2019, 35, 609-618. (Year: 2019).*

Lin et al., Living Single Cell Analysis Platform Utilizing Microchannel, Single Cell Chamber, and Extended-nano Channel. Anal. Sci. 32, 75-78, Published Jan. 10, 2016 (Year: 2016).*

* cited by examiner

Single-cell analysis

On-demand droplet generator

PDMS Channels with droplet bridge (iii)

SU8-5 dielectric (ii)

Electrodes (i)

velocity streamlines    velocity profile [m/s]    pressure profile [Pa]

Release onTime 1.1s
Period 1.3 s onTime 1.1s
Period 1.3 s

Keep onTime <10s
Period <10s

50μm

Electroporation eGFP Knockout

Lipid based transfection

RAF1                    eGFP Knockout

1. Prime

2. Trap

3. Encapsulate

4. Operate

5. Recover

| 1. Prime |
| 2. Trap |
| 3. Encapsulate |
| 4. Operate |
| 5. Recover |

Capillary recovery and centrifugation 96-well plating

Optimization using NCI-H1299 eGFP

Day 2

Day 5

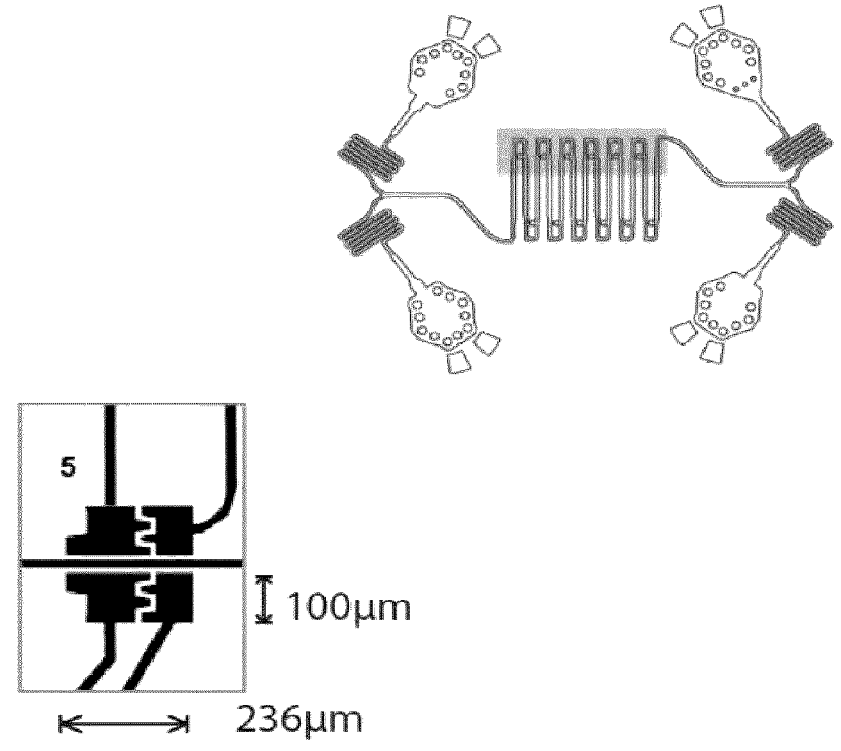
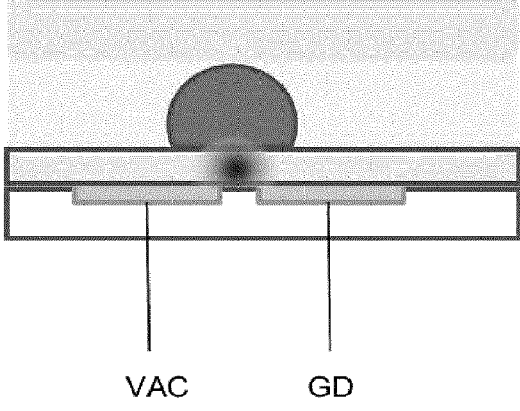
Fig. 18
Fig. 19

PDMS slab
(Substrate 4)

Channel layer
(Substrate 3)

Dielectric layer
(Substrate 2)

→ Digital microfluidic layer
with arrays of electrodes
(Substrate 1)

PDMS
Channels (iii)

SU8-5
dielectric (ii)

Electrodes
on glass (i)

Oil →

100μm

↑
Aqueous

On-demand droplet generator

Single-cell analysis

Velocity streamlines   Velocity profile [m.s⁻¹]   Pressure profile [kPa]

O2     I1

O1     I2     O3     I4     I3

Priming (I1, O1)     Trap cells (I1)     Droplet generation (I3, I4)

Encapsulation (I2)     Droplet operations (I2, O2)

BF, 460nm, 565nm

INTEGRATED DROPLET-DIGITAL MICROFLUIDIC SYSTEM FOR ON-DEMAND DROPLET CREATION, MIXING, INCUBATION, AND SORTING OF DROPLETS IN A CELL TRAPPING ARRAY

TECHNICAL FIELD

The embodiments disclosed herein relate to microfluidic devices, systems, and methods, and more specifically, to devices, systems, and methods for integrating a droplet-digital microfluidic system for on-demand droplet creation, mixing, incubation, and sorting of droplets in a cell trapping array.

BACKGROUND

Over the last few years, a number of gene editing techniques using for example CRISPR/Cas9, TALEN and ZFN have been useful to perform precise gene knock-outs, knock-ins or base editing for various end goals such as deciphering cancer pathways or generating production lines. Once transfection occurs, a heterozygous population of cells is obtained which then requires selecting and sorting out of the edited cells. The process of selecting and sorting out the cells is laborious and time consuming. Currently, isolating an isogenic population from a heterogeneous population poses a challenge since desired gene edits may be phenotypically silent. Resistance screens or fluorescent activated cell sorters (FACS) are commonly used to sort the cells. Sorting methods can achieve high-purity single cells, but their viability after sorting is often low to moderate—especially methods that are sensitive to low cell density culture conditions. Limited dilution can be performed in the hopes of finding the right clones however this technique relies heavily on chance and probability—resulting in low purity single cells. As such currently existing methods are not easy to integrate and therefore difficult to standardize resulting in non-reproducible results.

SUMMARY

According to a broad aspect, a microfluidic device is described herein. The microfluidic device includes a first layer including a plurality of electrodes; a second layer disposed on top of the first layer, the second layer including a dielectric patterned over the electrodes; and a third layer disposed on top of the second layer. The third layer includes a droplet generator for generating droplets of fluid; and a cell trapping array including: a first inlet for receiving the droplets of fluid from the droplet generator; a second inlet for receiving cells in solution; a channel for carrying the droplets of fluid and/or the cells in solution from the first inlet and the second inlet, respectively, towards an outlet; and one or more traps extending away from the channel, each trap configured to receive and retain cells in solution and droplets of fluid from the channel.

According to another broad aspect, a method of trapping a cell in a microfluidic device is described herein. The method includes receiving a solution of cells by a channel of the microfluidic device; directing the solution of cells towards a trap of the microfluidic device by actuating one or more electrodes positioned beneath the channel; and retaining one of the cells in the trap, the trap positioned above a plurality of electrodes.

According to another broad aspect, a method of encapsulating a cell in a fluid droplet is described herein. The method includes receiving a solution of cells by a channel of the microfluidic device; directing the solution of cells towards a trap of the microfluidic device by actuating one or more electrodes positioned beneath the channel; retaining one of the cells in the trap, the trap positioned above a plurality of electrodes; receiving droplets of fluid by the channel of the microfluidic device; directing the droplets of fluid towards the trap of the microfluidic device by actuating one or more electrodes positioned beneath the channel; retaining one of the droplets of fluid in the trap, the trap positioned above a plurality of electrodes; directing the one of the cells in the trap towards the one of the droplets of fluid in the trap to encapsulate the cell in the droplet of fluid.

According to another broad aspect, a microfluidic device is described herein. The microfluidic device includes a first layer including a plurality of co-planar electrodes; a second layer disposed on top of the first layer, the second layer including a dielectric material patterned over the electrodes; and a third layer disposed on top of the second layer, the third layer including microfluidic channels including: a trapping array including: a channel fluidly coupled to a first inlet and a second inlet for carrying a first fluid from the first inlet and/or a second fluid from the second inlet toward an outlet of the trapping array, the first fluid comprising one or more particles in solution; and one or more traps extending away from the channel, each trap configured to receive and retain a trapped element from the channel.

According to another broad aspect, a method of trapping a particle in a microfluidic device is described herein. The method includes:

directing a first fluid into a channel of the microfluidic device, the first fluid having an aqueous phase and at least one particle dispersed within the aqueous phase;

directing the first fluid towards a trap of the microfluidic device; and retaining at least one of the particles of the first fluid in the trap, the trap being positioned above a plurality of electrodes.

the method may further include increasing a flow rate of the first fluid through the channel towards the trap to expel the at least one of the particles from the trap.

According to another broad aspect, a method of generating a droplet in a microfluidic device is described herein. The method includes:

directing a first fluid into a channel of the microfluidic device, the first fluid having an aqueous phase optionally with particles dispersed within the aqueous phase;

directing a second fluid into the channel of the microfluidic device, the second fluid being immiscible with the aqueous phase of the first fluid;

as the second fluid reaches a trap of the microfluidic device, the trap being fluidly coupled to and extending from the channel of the microfluidic device and containing at least a portion of the aqueous phase of the first fluid, actuating one or more electrodes positioned underneath the trap to maintain the first fluid within the trap and so generate the droplet of the first fluid within the second fluid.

According to another broad aspect, a method of deterministically encapsulating a particle in a droplet in a microfluidic device is described herein. The method includes:

directing a first fluid into a channel of the microfluidic device, the first fluid having an aqueous phase and one, or more than one, particles dispersed within the aqueous phase;

directing the first fluid towards a trap of the microfluidic device, the trap being fluidly coupled to and extending laterally from the channel of the microfluidic device;

retaining at least one of the one or more particles of the first fluid in the trap, the trap being positioned above a plurality of electrodes;

directing a second fluid into the channel of the microfluidic device, the second fluid being immiscible with the aqueous phase of the first fluid;

as the second fluid reaches the trap of the microfluidic device, actuating one or more electrodes positioned underneath the trap to maintain the first fluid and particle within the trap and generate the droplet of the first fluid containing the particle within the second fluid.

According to another broad aspect, a method of merging two or more droplets within a microfluidic device is described herein. The method includes;

trapping a first droplet in a trap of the microfluidic device by directing the first droplet towards the trap;

directing a second droplet towards the trap; and as the second drop reaches the trap, actuating one or more electrodes positioned underneath the trap.

Each of the first droplet and the second droplet may contain particles, possibly a single particle.

According to another broad aspect, a method of collecting a droplet from a microfluidic device described herein is described herein. The method includes:

directing the droplet towards the outlet of the microfluidic device; and absorbing the droplet into a capillary-like structure;

wherein, once absorbed, the droplet can be transferred into a secondary recipient such as a well-plate, a petri dish, a microscope slide, a microscope chamber, a culturing dish or other observational or growth chamber.

The method may also include absorbing an oil phase of a fluid from the microfluidic device using an oleophilic hydrophobic material.

Use of a microfluidic device described herein in an assay is also described herein. The assay may be a single cell viability assay, a single cell drug inhibition assay, an assay for gene editing, an assay for single cell transfection, a single cell sorting assay, an isoclonal selection assay, an assay for delivery of chemicals, materials and/or drugs to single cells, an assay for analysis of cell products such as but not limited to antibodies, an incubation assay, and/or a microscopy-based assay.

The use may also be for sorting mammalian cells, such as but not limited to sorting mammalian cells after they have been edited into single clones.

According to another broad aspect, a method of sorting mammalian cells with a microfluidic device is described herein. The method includes:

trapping a population of mammalian cells within traps of the microfluidic device;

encapsulating each cell of the population of cells within a respective droplet;

directing each of the droplets towards an outlet of the microfluidic device; and collecting the droplets from the microfluidic device.

The single cell may be a mammalian cell.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 5C is a graph showing the likelihood of droplet release as a function of reversed oil flowrate.

From left to right images, a single cell is first trapped, as identified by the arrow, followed by incoming oil flow (0.004 µL s$^{-1}$). An electrode is then actuated, as shown by red dot (15 kHz, 124 V$_{RMS}$).

Figure 9:
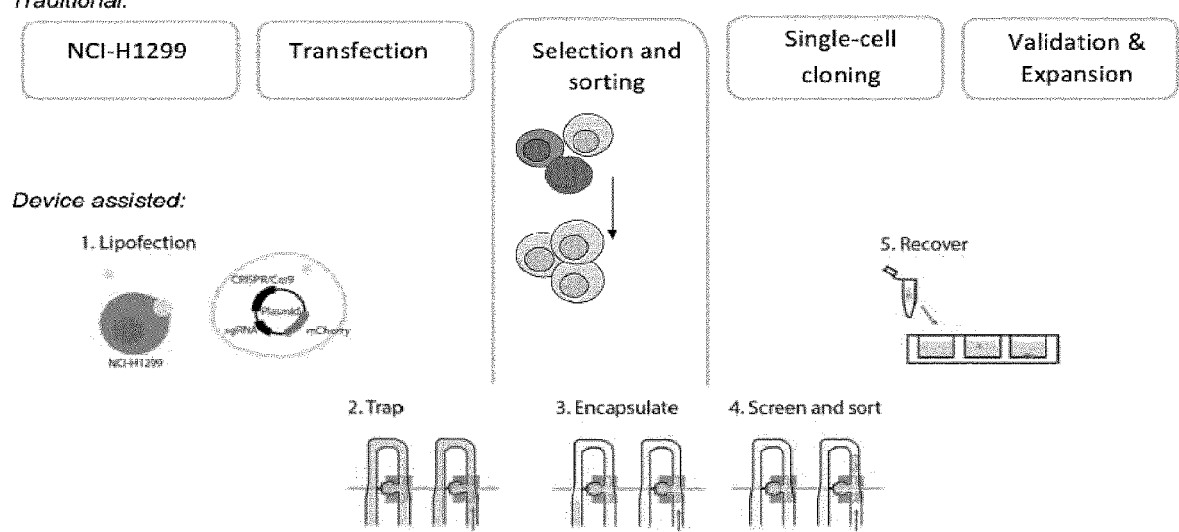
Figure 10:
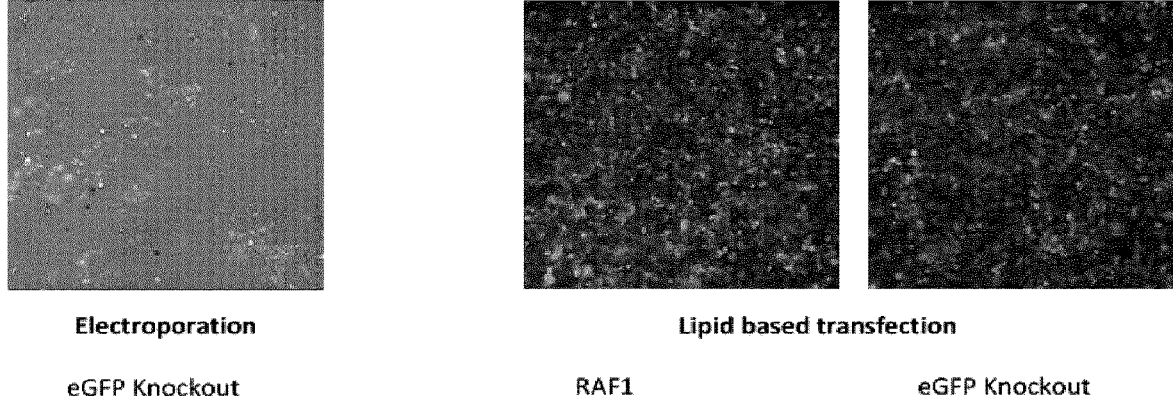

FIG. 9 is a schematic comparing cell selection and sorting using traditional methods compared to cell selection and sorting using the device described herein. =slide 29 oral presentation FIG. 10 is a panel of images showing NCI-H1299 cells transfected with a guide designed to knock out eGFP expression or the RAF1 gene.

Figure 11:
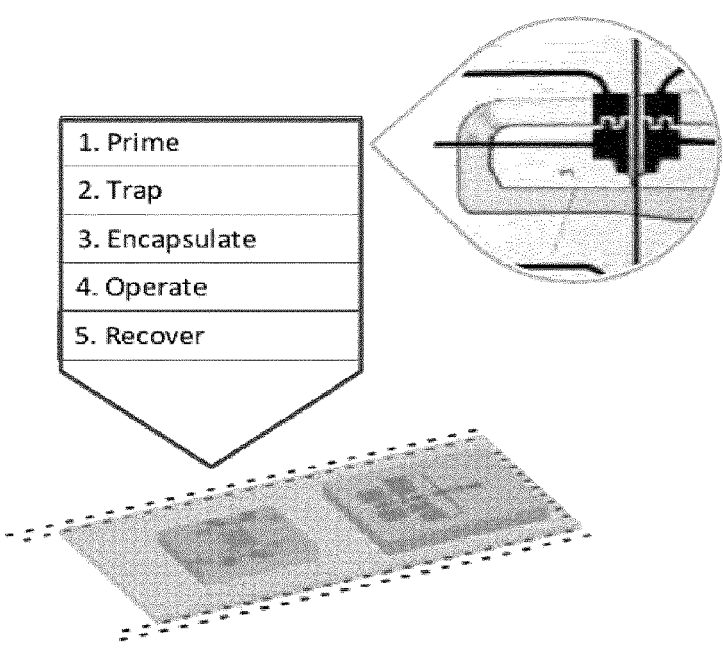

FIG. 11 is a schematic illustrating a priming step.

Figure 12:
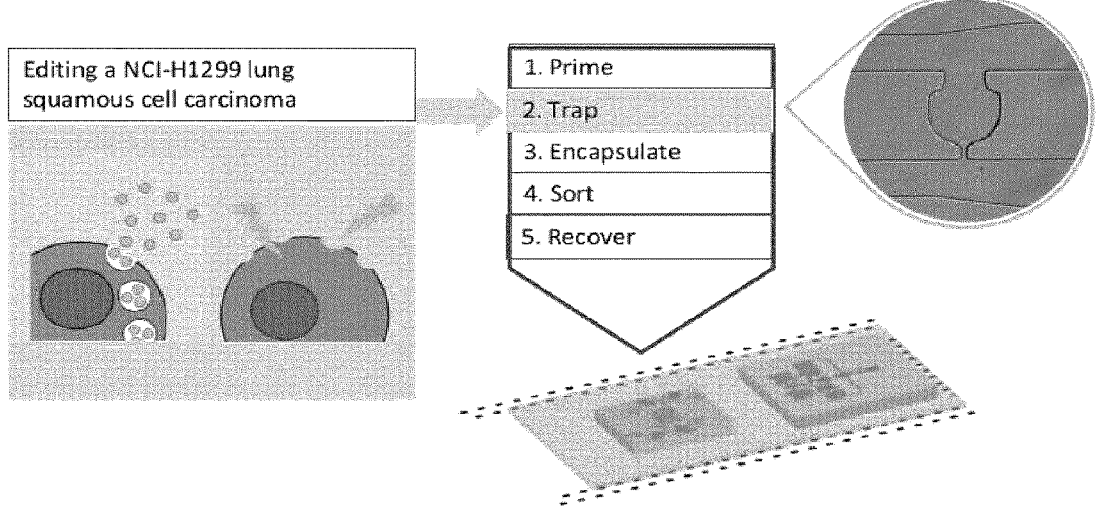

FIG. 12 is a schematic illustrating a cell trapping step.

Figure 13:
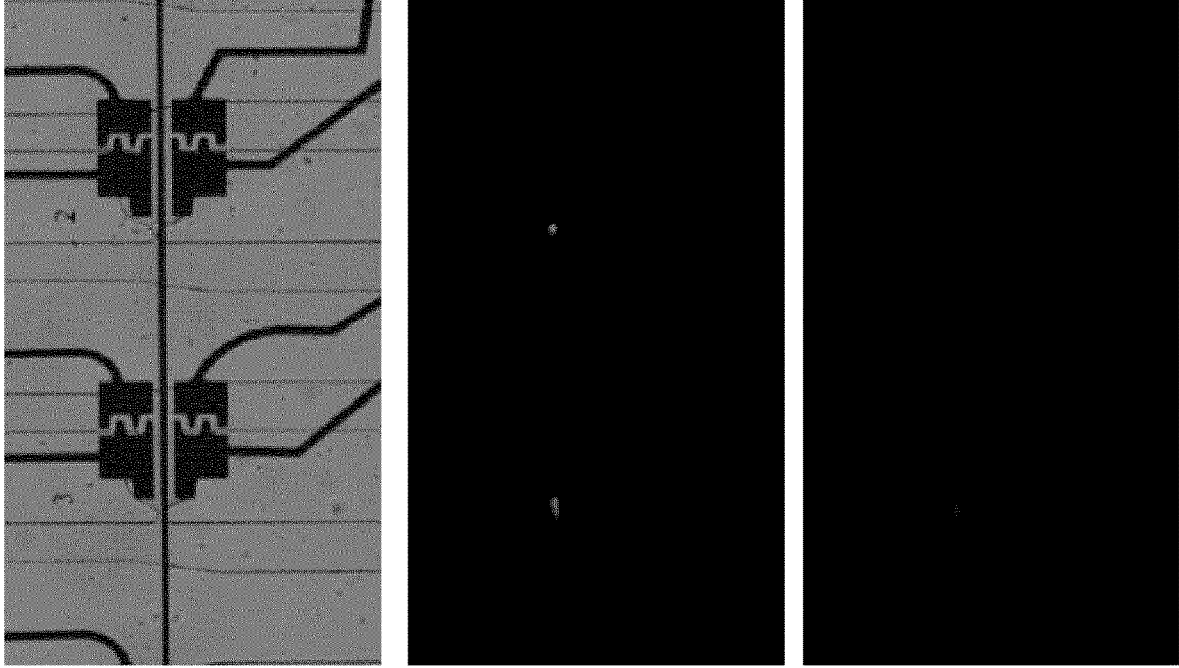

FIG. 13 is a series of images showing trapping of transfected NCI-H1299 cells. The left image shows single isoclones trapped in a trap area. The middle image identifies the trapped isoclones as eGFP$_+$. The right image shows that the bottom cell also expresses mCherry, indicating successful uptake of the plasmid.

Figure 14:
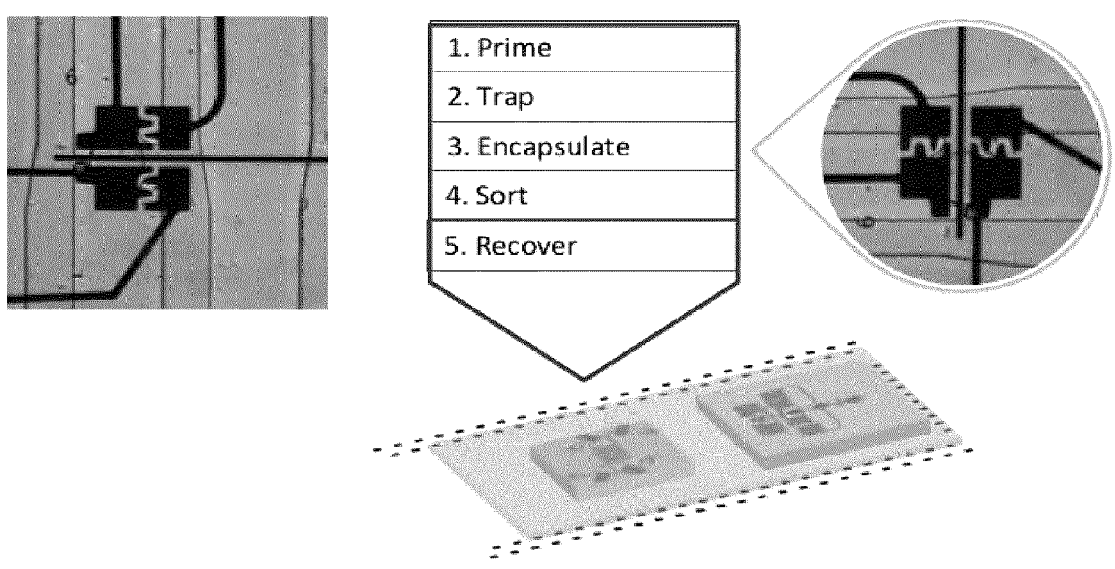

FIG. 14 is a schematic illustrating an encapsulation step.

Figure 15:
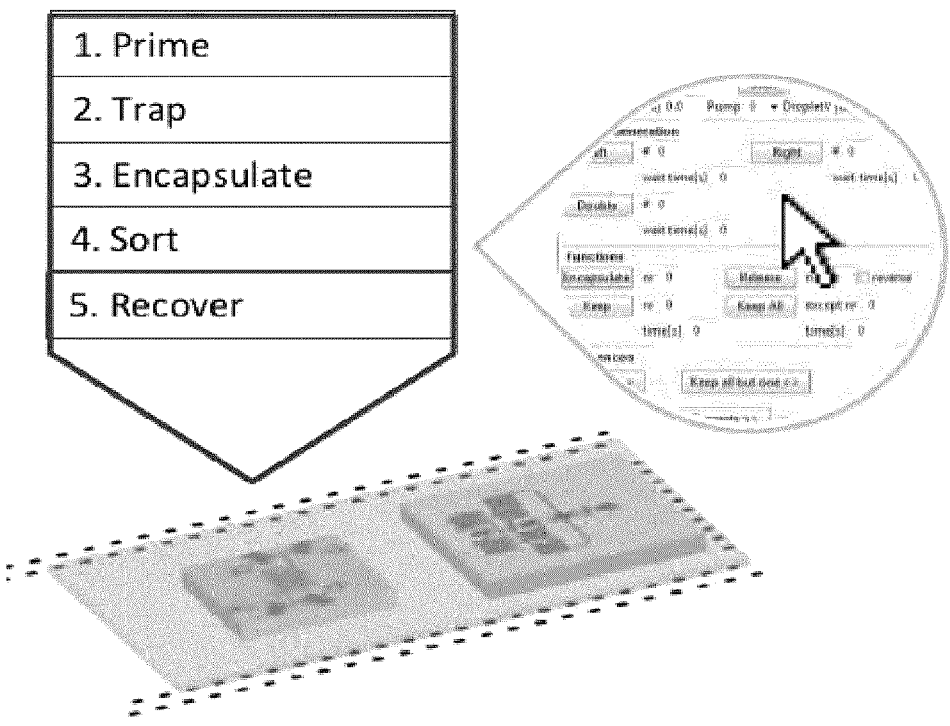

FIG. 15 is a schematic illustrating a sorting method. Using a graphical user interface (GUI) on-demand release of transfected isoclone droplets and reverse flow may be achieved.

Figure 16:
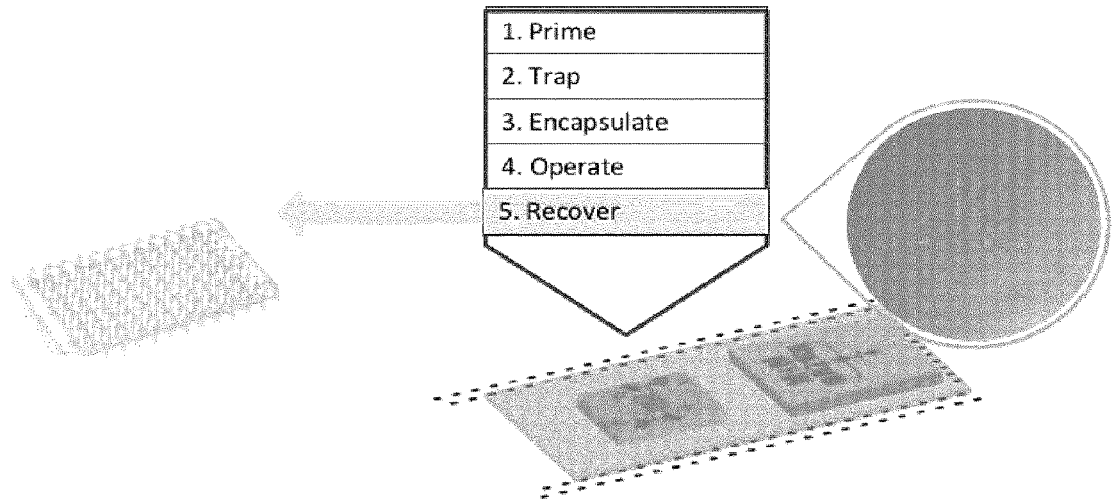

FIG. 16 is a schematic illustrating a recovery step.

Figure 17:
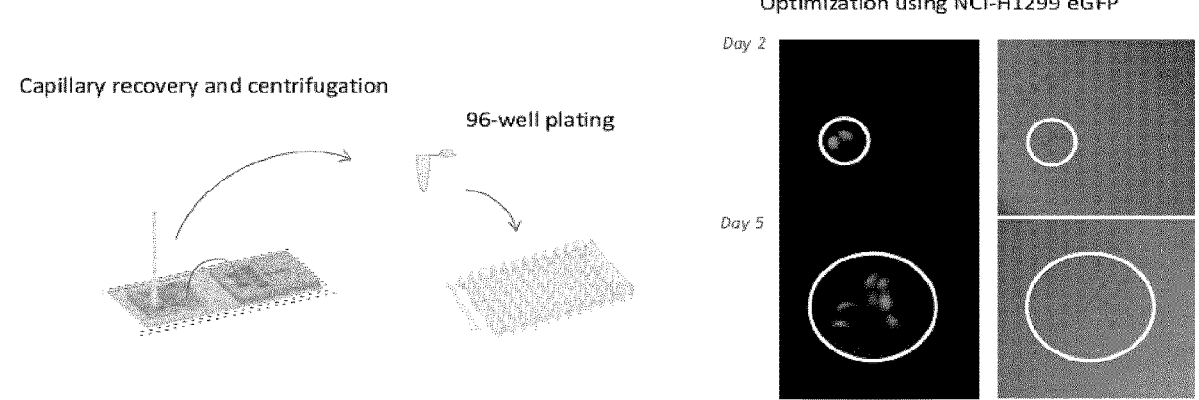

FIG. 17 is a schematic illustrating a clone recovery and expansion step.

FIG. 18 is an up-close view of the cell trapping array of the device and of the electrodes located under the cell trapping array.

FIG. 19 is a schematic of a drop of liquid deposited on a microfluidic device, according to one embodiment described herein.

Figure 20:
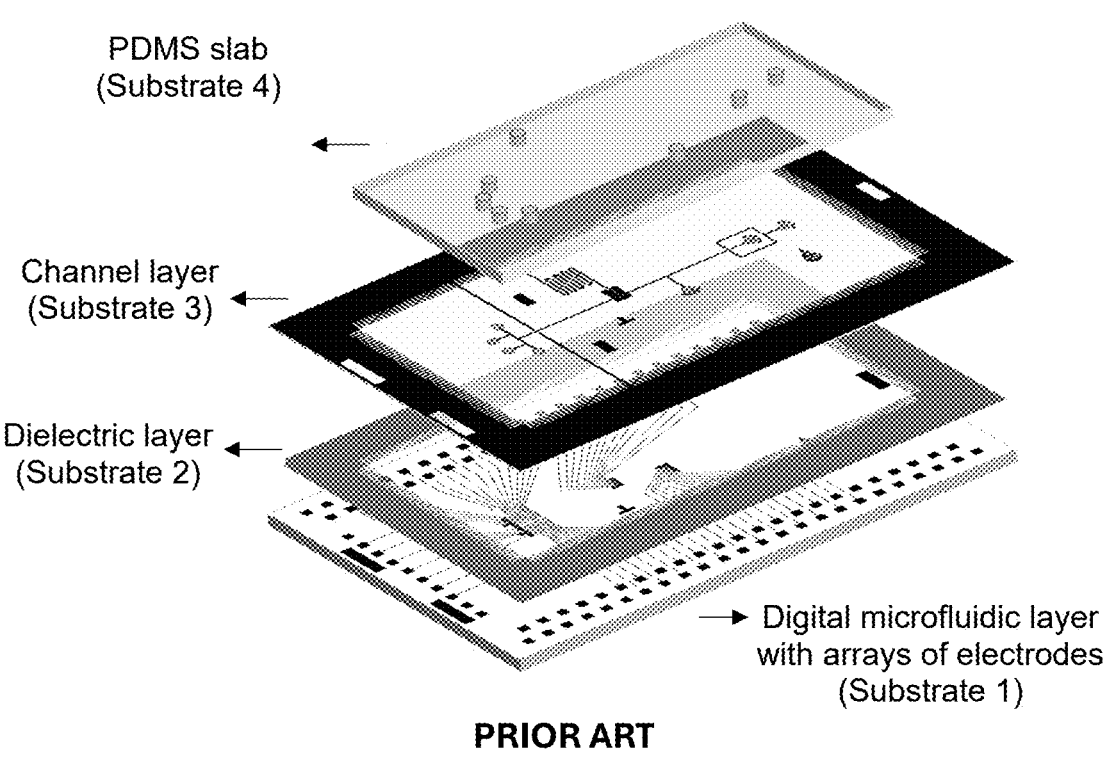

FIG. 20 is an exploded view of a prior art microfluidic array.

Figure 21:
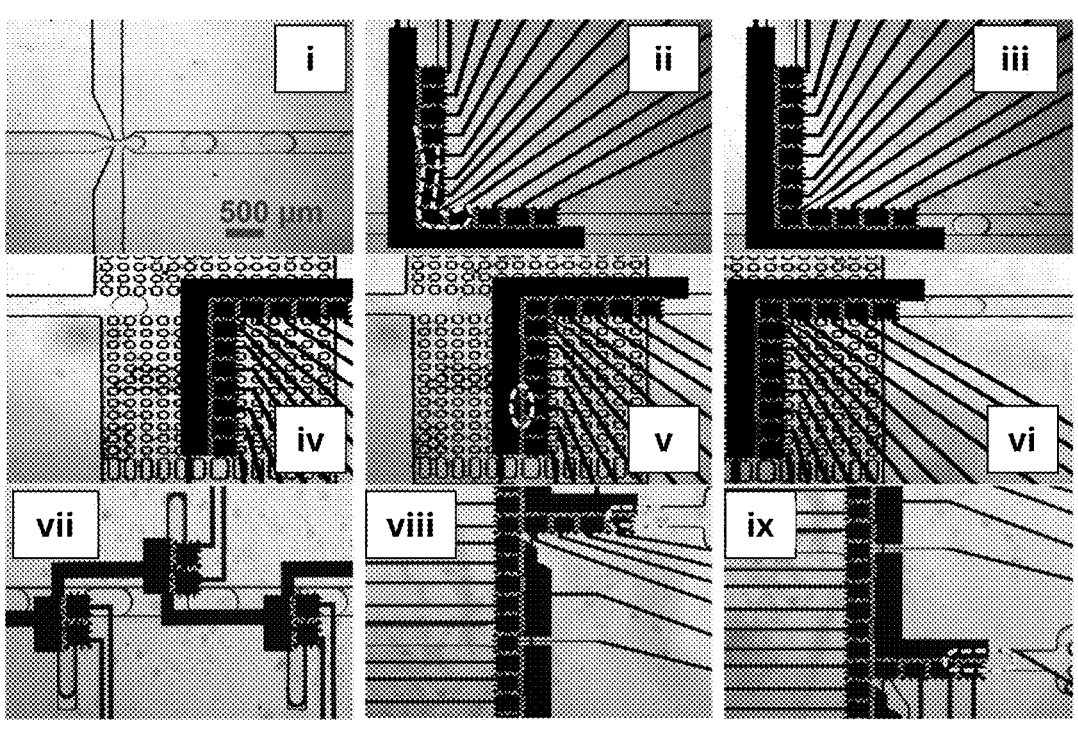

FIG. 21 is a series of images showing on-demand droplet generation according to the prior art microfluidic array of FIG. 20.

Figure 22:
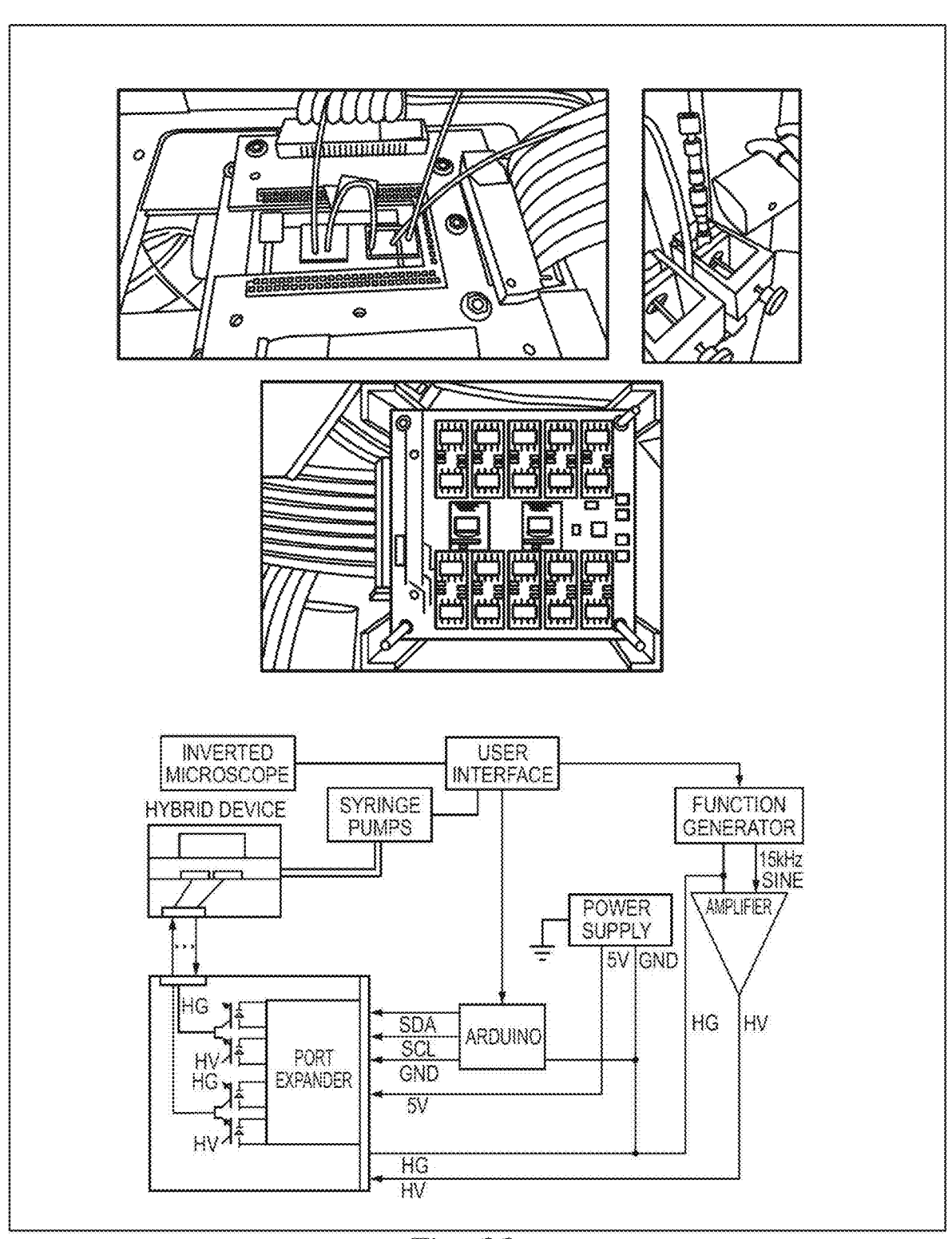

FIG. 22 is a series of images showing the microfluidic device, according to an embodiment.

Figure 23:
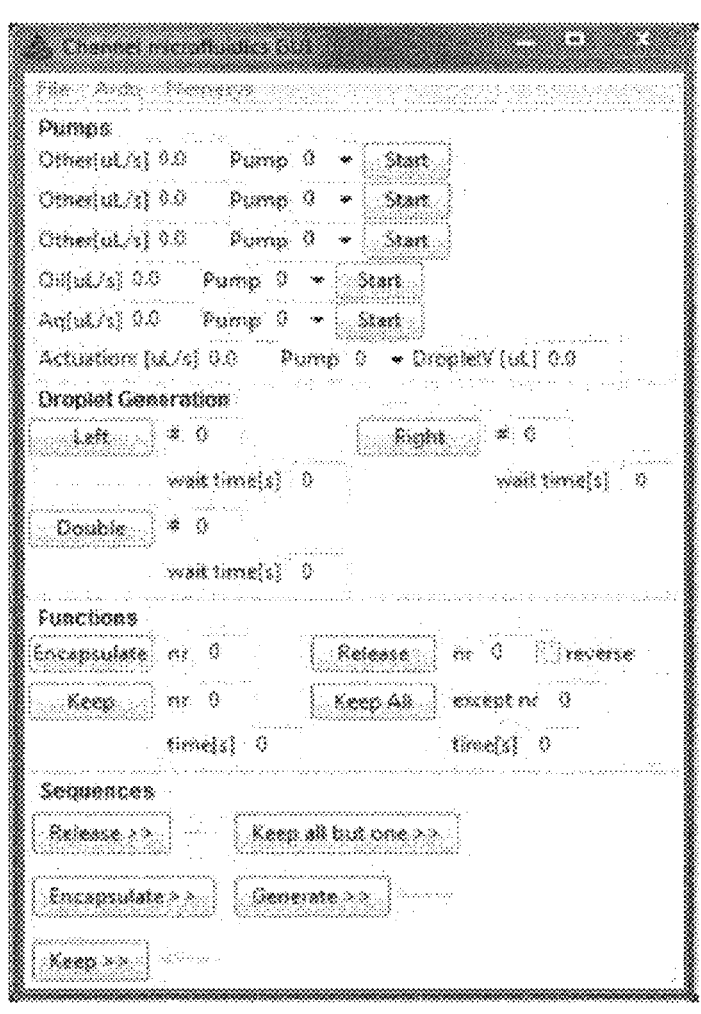

FIG. 23 is an image of a graphical user interface for on-demand operations on droplets.

Figure 24A:
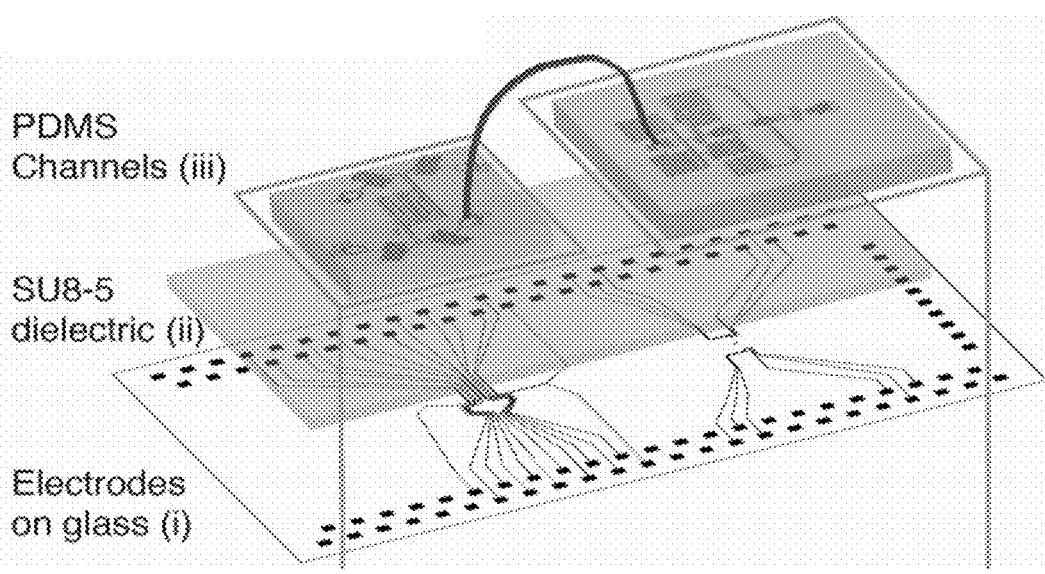

FIG. 24A is a perspective view of an integrated droplet digital device for on-demand single-cell encapsulation and single cell analysis.

Figure 24B:
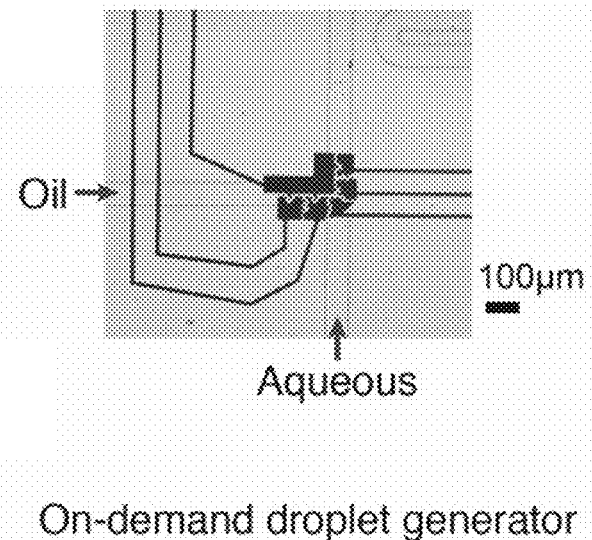

FIG. 24B is a top view of a droplet generation device of the device of FIG. 24A having two T-junction droplet generators, under which several electrodes are located below the channel to initiate on-demand droplet generation.

Figure 24C:
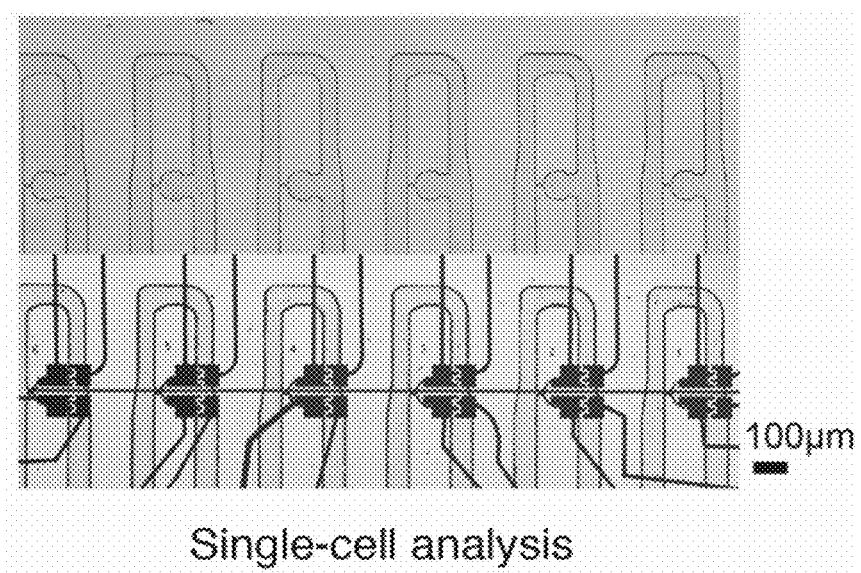

FIG. 24C is a top down view of a single-cell analysis device of the device of FIG. 24A having 4 ports acting as an inlet or an outlet.

Figure 25A:
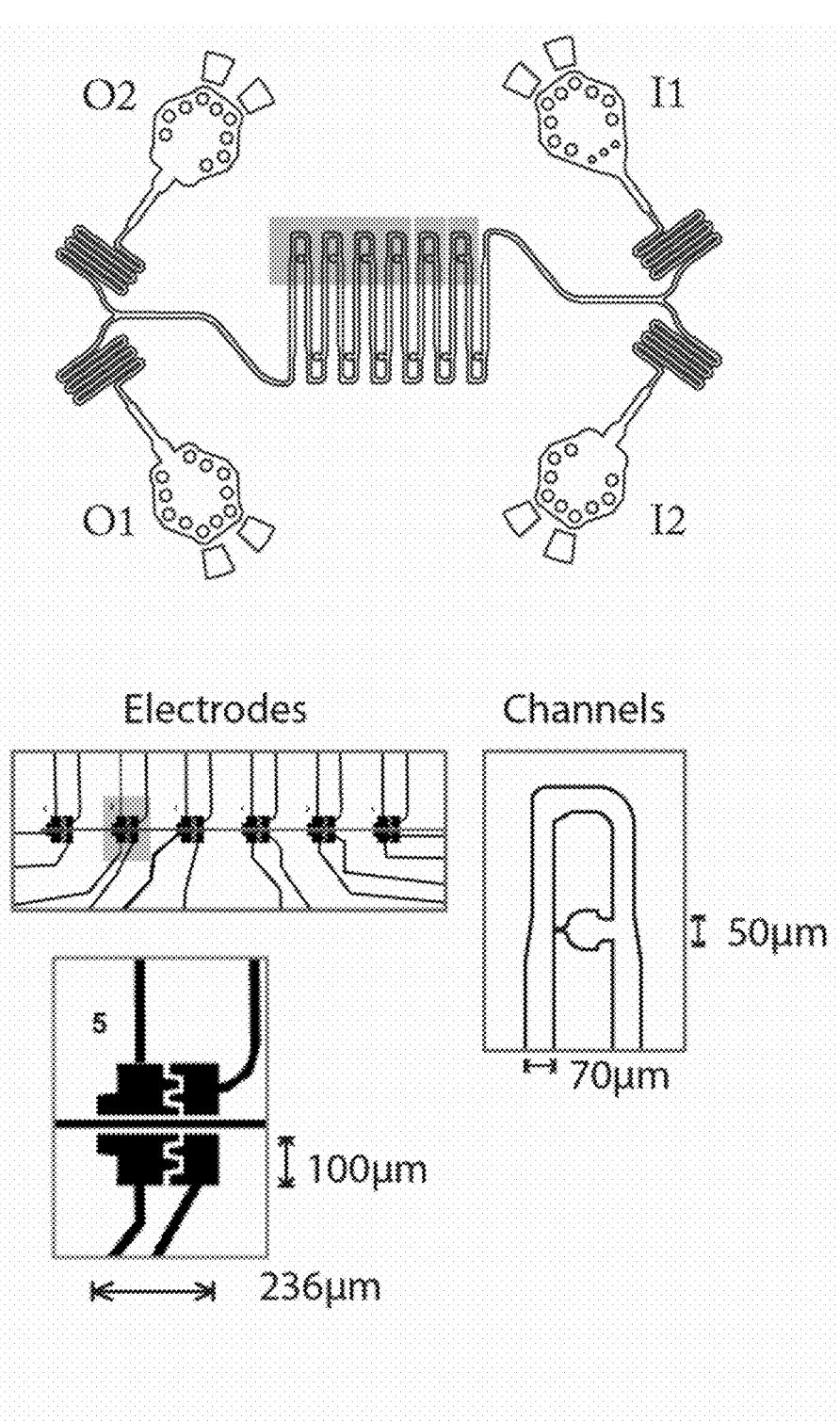

FIG. 25A is a top down view of the single cell analysis device of FIG. 24A, according to at least one embodiment, showing a serpentine trapping channel having two inlets (I1, I2), two outlets (O1, O2) and 6 traps lined with electrodes (also shown enlarged thereunder).

Figure 25B:
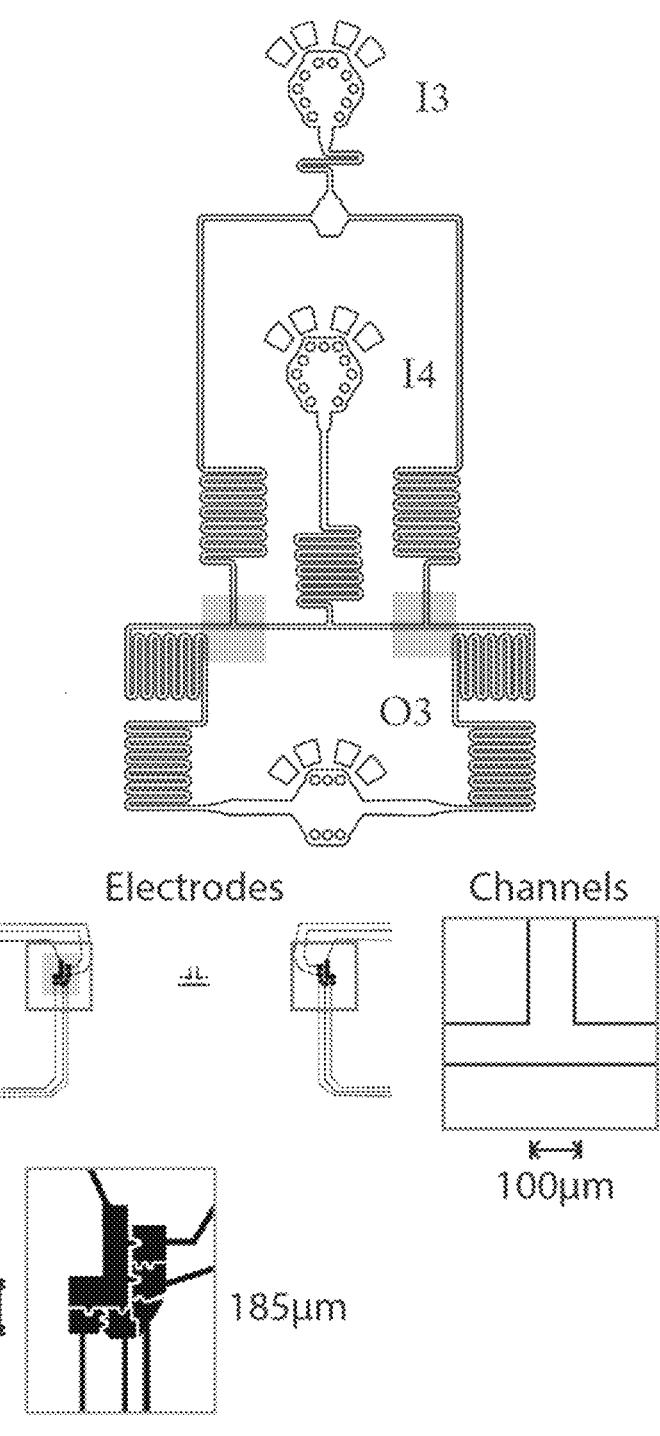

FIG. 25B is a top down view of the droplet generator of FIG. 24B having two inlets (I3, I4), one outlet (O3) and an area (shaded) that is lined with electrodes (also shown enlarged thereunder).

Figure 26A:
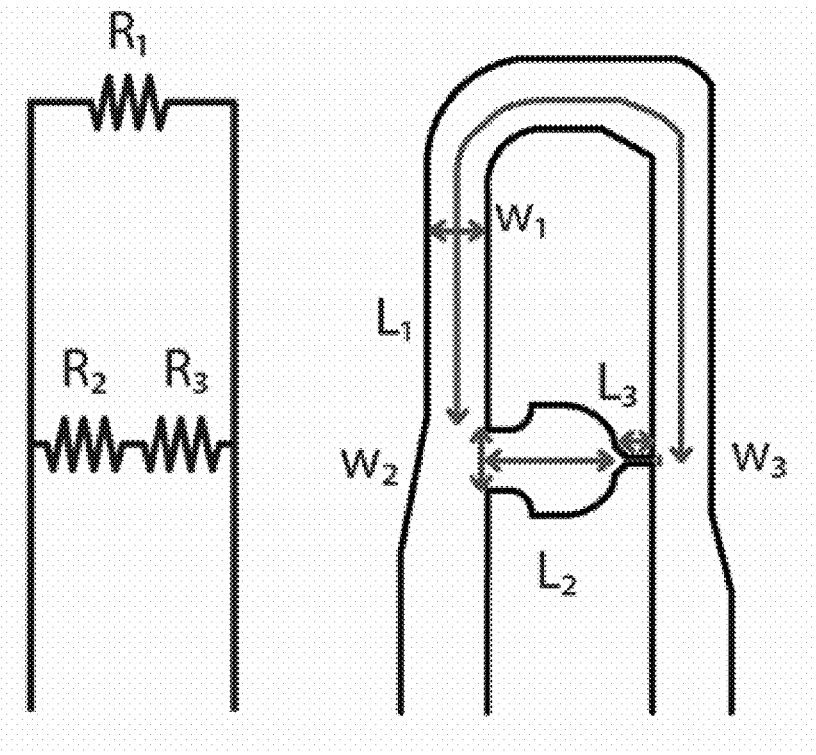

FIG. 26A is an overlay of a resistor diagram on a portion of the trapping device shown in FIG. 24A showing that hydrodynamic resistance in the cell trap (R3) increases upon trapping a cell.

Figure 26B:
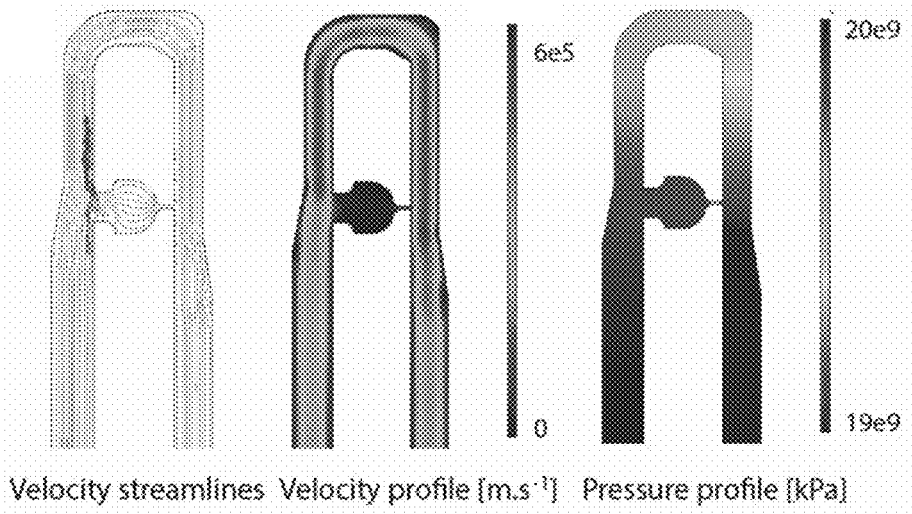

FIG. 26B is a top down view of Numerical simulations with a computational fluid dynamics software (CFD), showing flow velocity pattern across the portion of the trapping device shown in FIG. 26A.

Figure 27A:
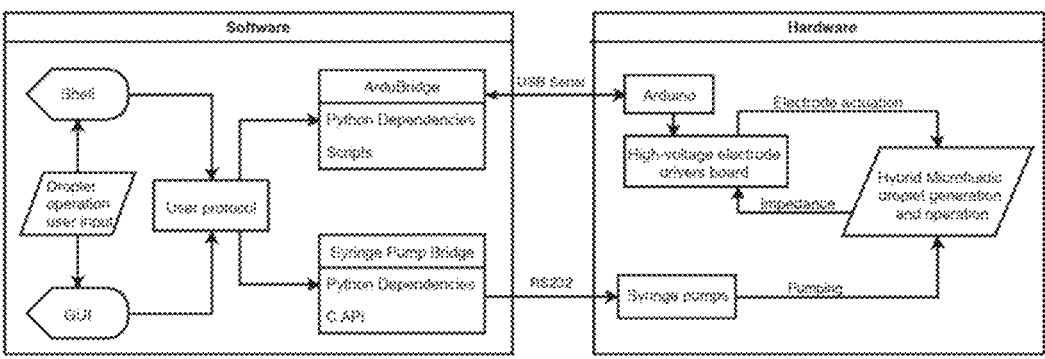

FIG. 27A is a diagram showing communication lines between software and hardware, with integration of pump and electrode operation through Python 2.7.

Figure 27B:
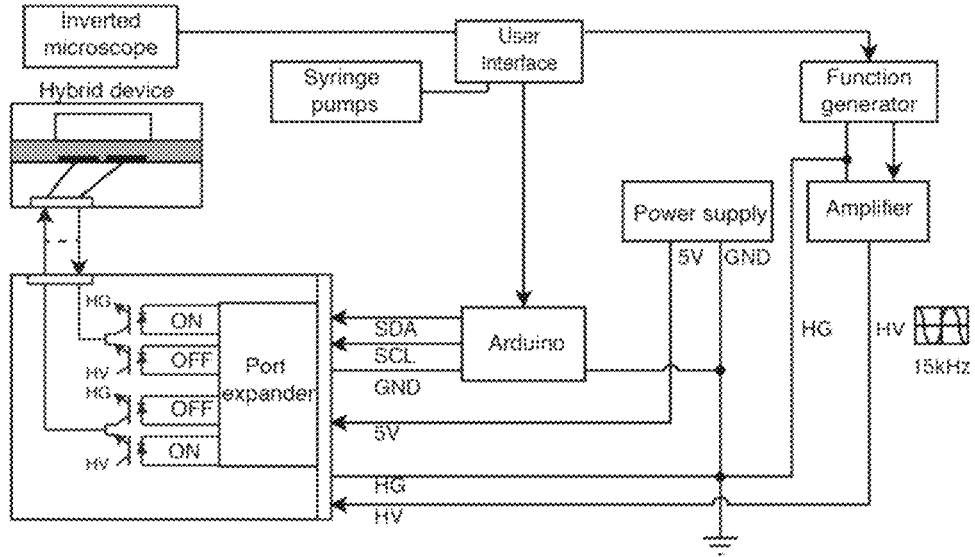

FIG. 27B is a diagram of a hardware setup showing an Arduino that controls an I2 C communication protocol to address specific optocouplers.

Figure 28A:
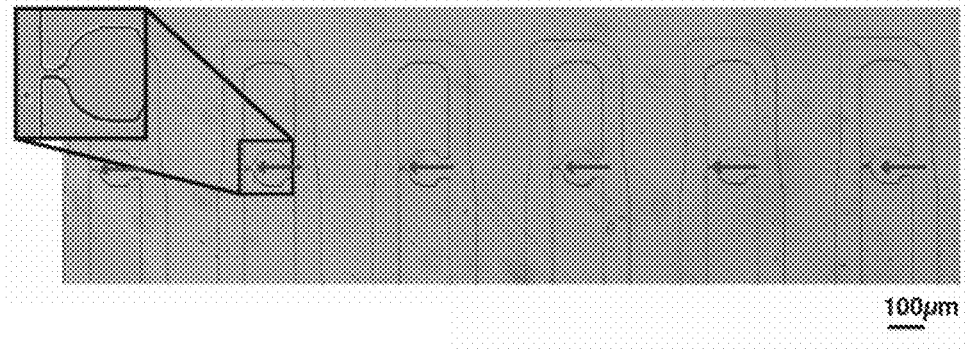

FIG. 28A is a top down view of a portion of the single cell analysis device of FIG. 24A showings single MCF-7 cells trapped in the constriction.

Figure 28B:
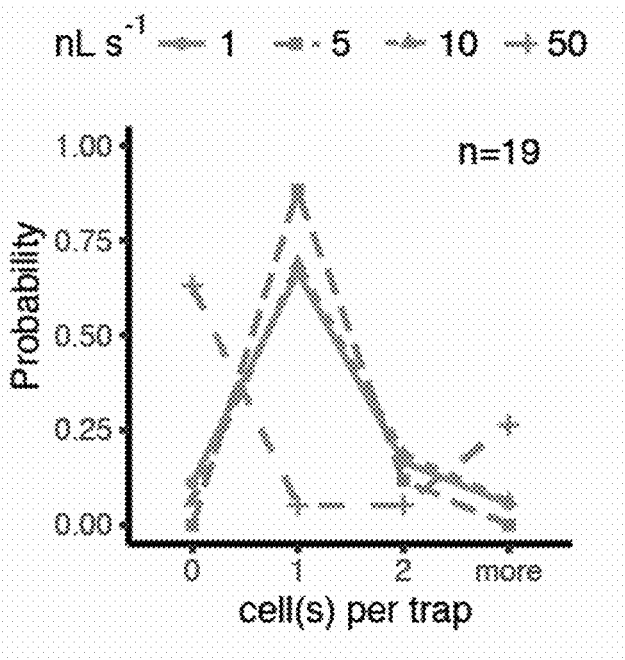

FIG. 28B is a graph showing an efficiency of trapping cells at different flowrates (1, 5, 10, 50 nL s-1).

Figure 28C:
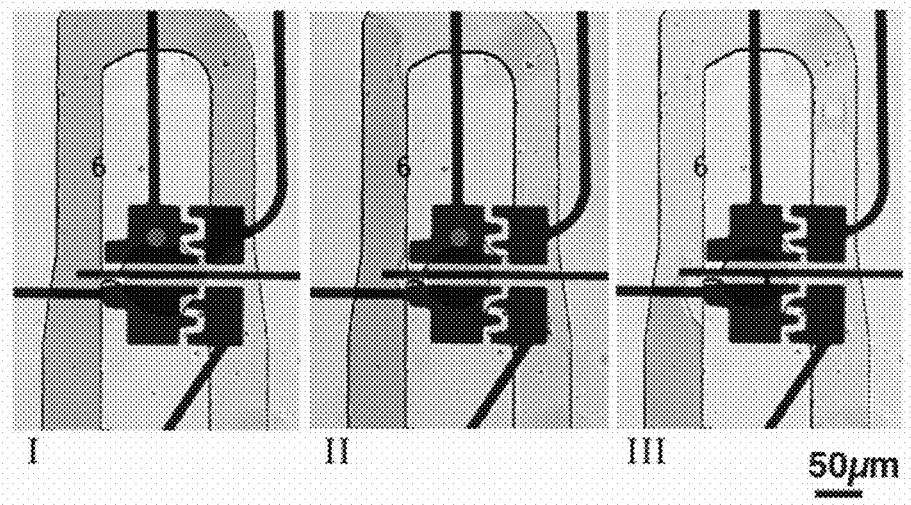

FIG. 28C shows images of an encapsulation procedure according to at least one embodiment described herein. Therein, Frame I shows a single MCF-7 cell trapped, Frame II shows a droplet was formed within the trap and the oil phase continues through the bypass channel and Frame III shows an encapsulated MCF-7 cell in a droplet. False color was used to highlight the liquid flow and droplet inside the channel.

Figure 29:
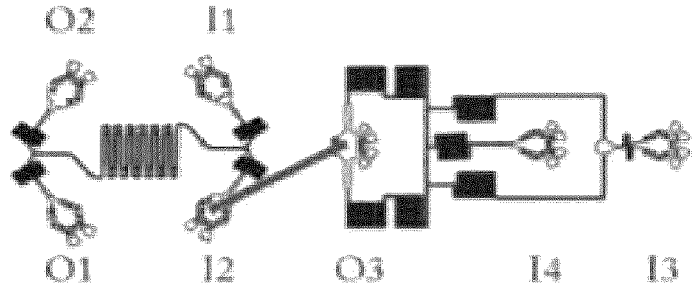
Figure 29:
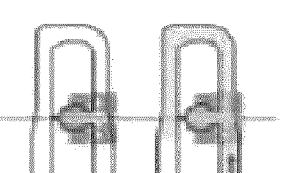
Figure 29:
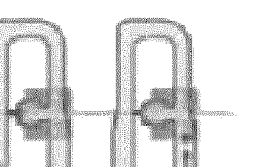
Figure 29:
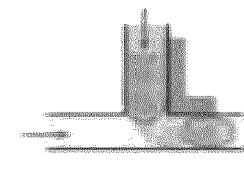
Figure 29:
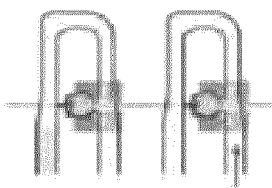
Figure 29:
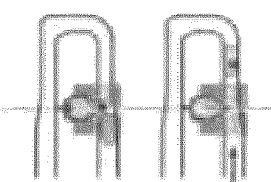
Figure 29:
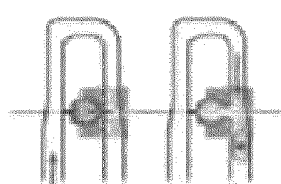

FIG. 29 shows steps of priming the device of FIG. 24A with 2% Pluronics F-127 in PBS for 5 min. MCF-7 cells in PBS are shown trapped. On-demand droplet generation can be selected to generate droplets, after which the aqueous flow is stopped. When all traps are loaded, oil (HFE 7500 2% Ran Fluorosurfactant) is loaded at 4 nL s$^{-1}$ by connecting the droplet bridge. Oil flow shears off a small volume of remaining PBS, which forms a droplet around the cells. Droplets are brought in through the droplet bridge and droplet operations can be performed. Oil flow can be reversed to collect droplets. The inlet (I #) and outlets (O #) that are used for each operation are designated for each operation.

Figure 30:
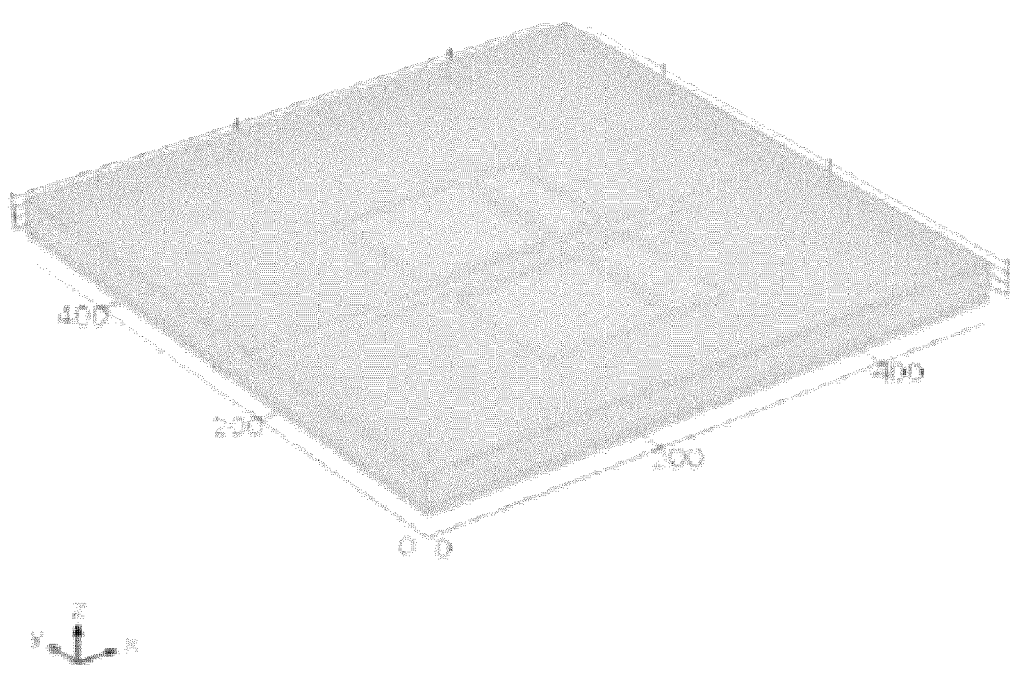

FIG. 30 is a geometry used for electric potential (V) and electric field (V m-1) modeling on 7 µm SU-8 5 dielectric layer above co-planar electrode surfaces using COMSOL Multiphysics electrostatics numerical modelling. Dimensions are in microns. Top layer is a 35 µm HFE 7500 oil layer, under which a 7 µm thick SU-8 5 layer is positioned with defined areas of potential or grounding.

Figure 31:
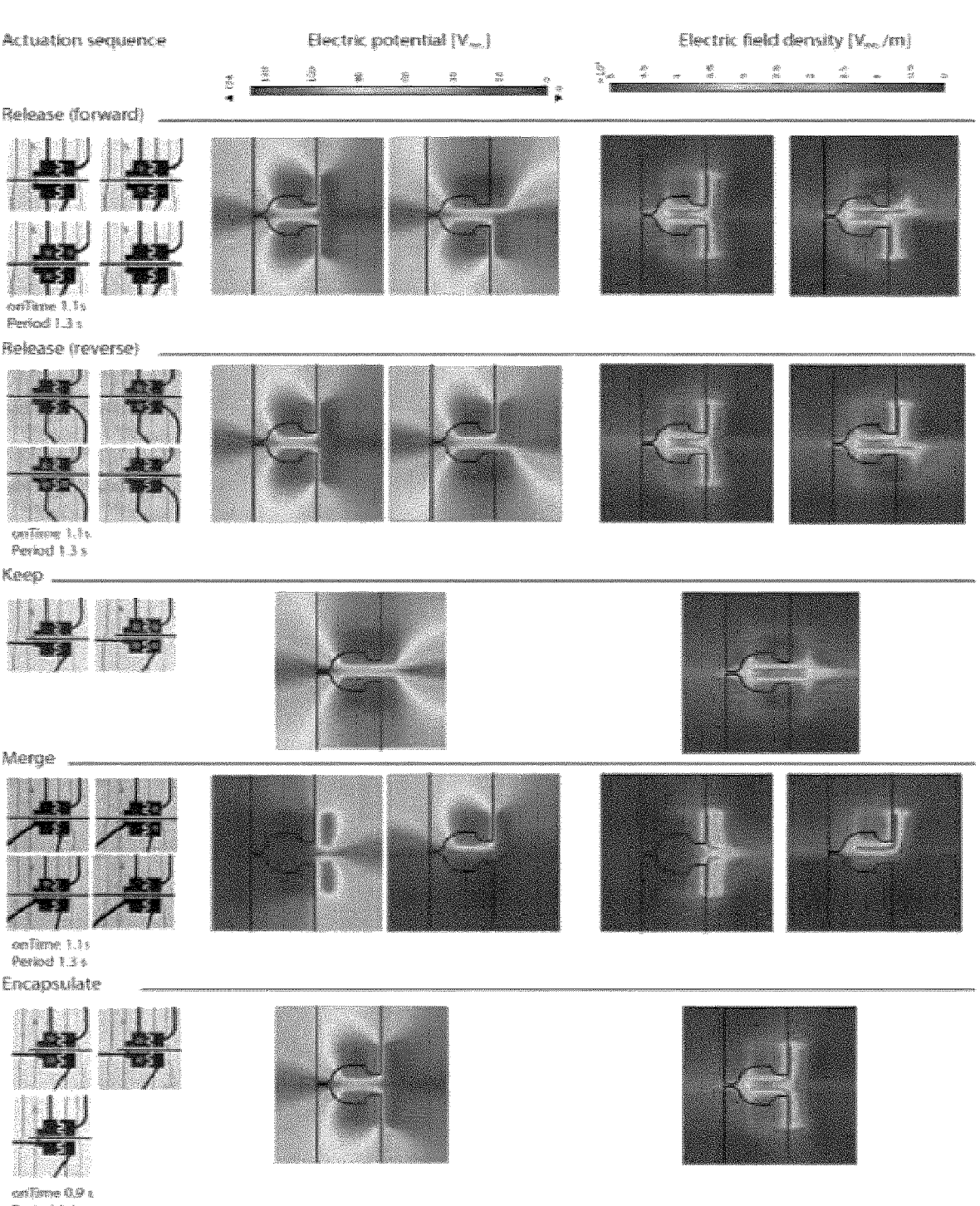

FIG. 31 is an electric potential (V) and electric field (V m$^{-1}$) on 7 µm SU-8 5 dielectric layer above co-planar electrode surfaces were modelled using COMSOL Multiphysics electrostatics numerical modelling. Actuated electrodes are marked by a red dot (bright field image, 15×). All droplet operations (encapsulation, release, merging, and keeping) were simulated using a potential of 126 V$_{RMS}$ at a frequency of 15 kHz with varying pulse width (0.9-1.1 s) and period (1.1-1.3 s).

Figure 32A:
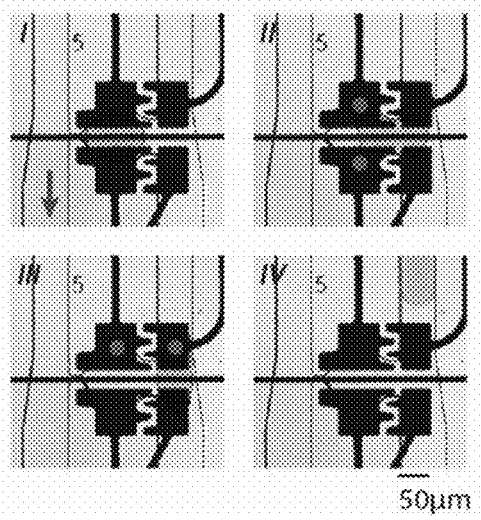

FIG. 32A is an actuation sequence of releasing droplet towards outlet on demand (15 kHz, 126 V$_{RMS}$).

Figure 32B:
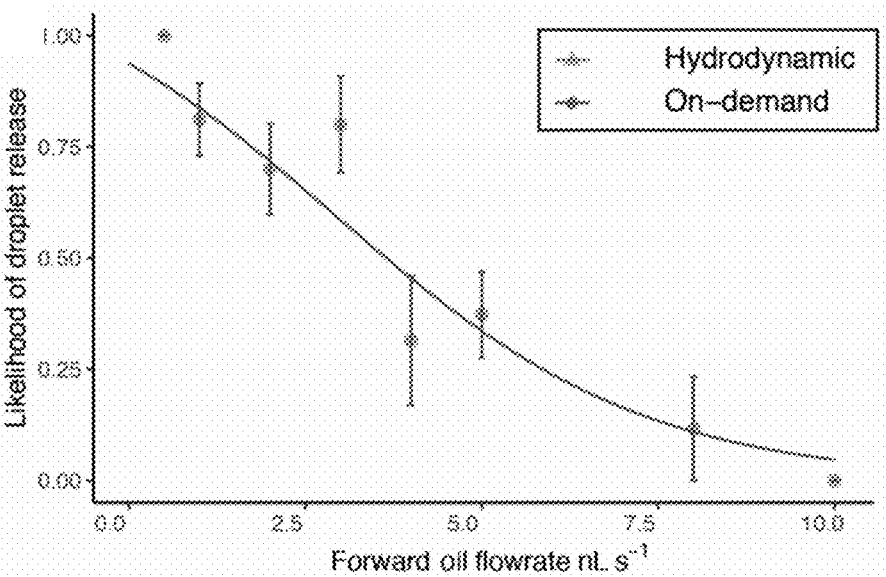

FIG. 32B shows efficiency of release of droplets under forward flowrate, under increasing flowrates (n=8, 10 replicates per trap).

Figure 32C:
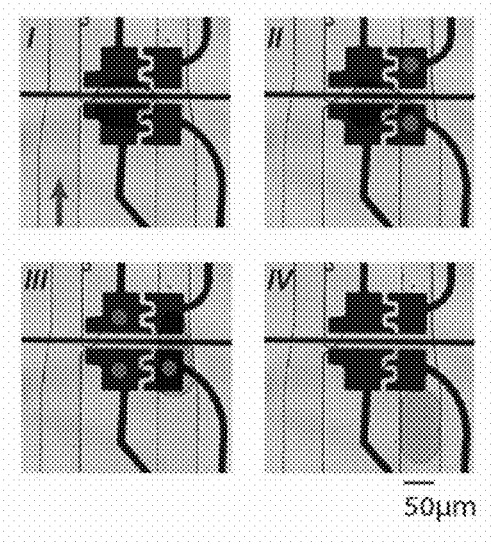

FIG. 32C is an actuation sequence of releasing a droplet towards inlets on demand (15 kHz, 126 V$_{RMS}$).

Figure 32D:
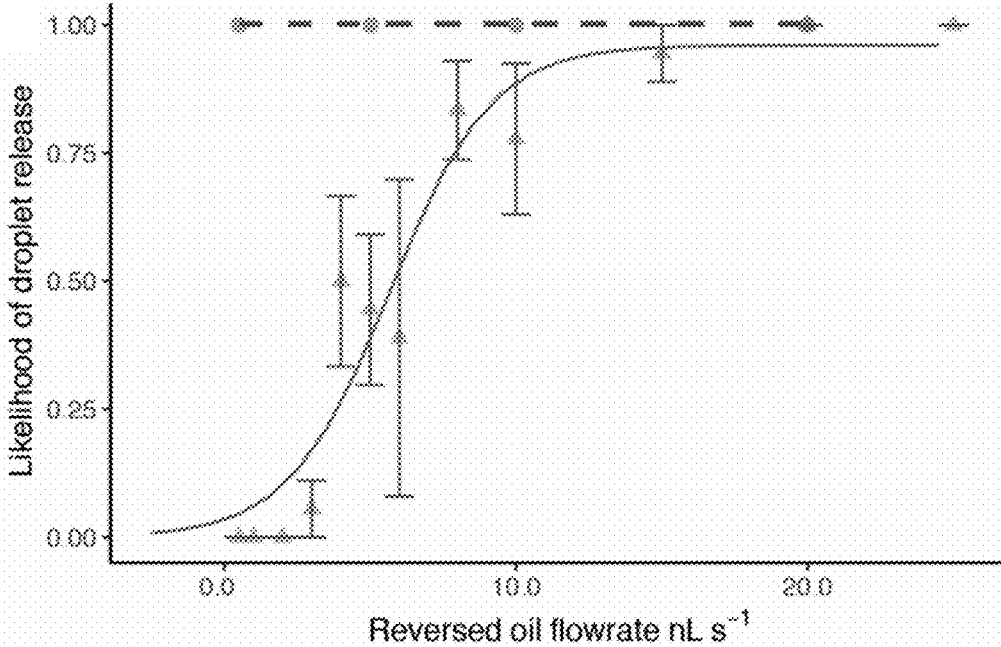

FIG. 32D shows efficiency of release of droplets under reversed flowrate. Hydrodynamically, droplets are released more efficiently towards the inlets, under increasing flow rate. With on-demand release, droplet show near-perfect release with applied flow rates between 0.5-20 nL s$^{-1}$.

Figure 32E:
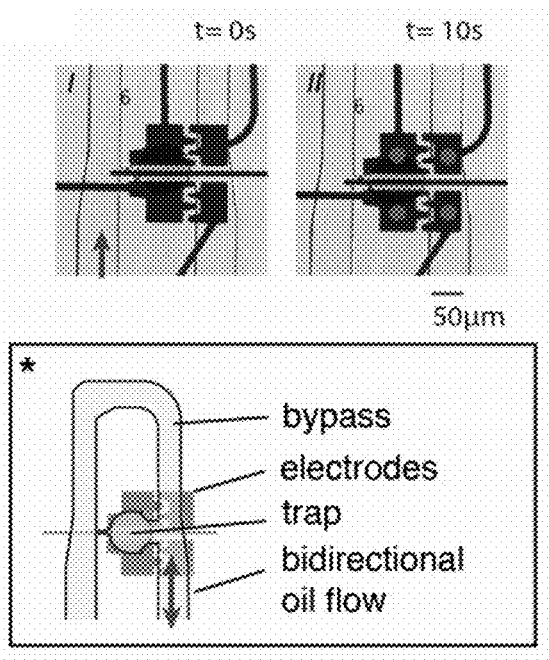

FIG. 32E is an actuation sequence of keeping droplets within trap under reversed flow rate (flow of oil from outlet to inlet) (15 kHz, 126 V$_{RMS}$, 10 s).

Figure 32F:
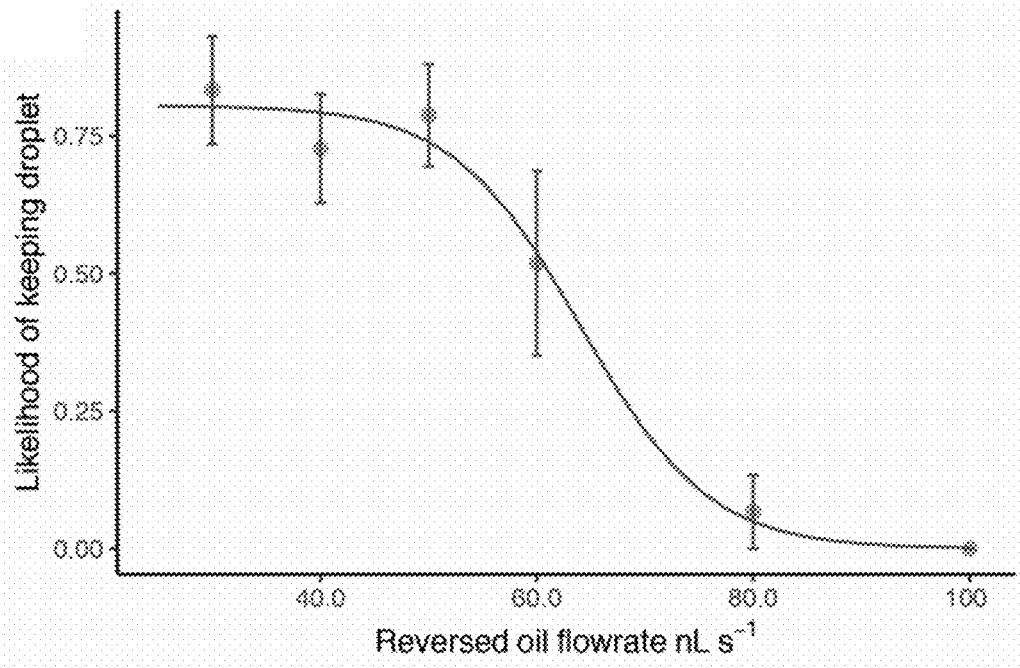

FIG. 32F shows efficiency of keeping droplets on-demand under reversed flow rate. Droplets can be kept efficiently (~78%) for flow rate lower than 45.4 nL s$^{-1}$.

Figure 33:
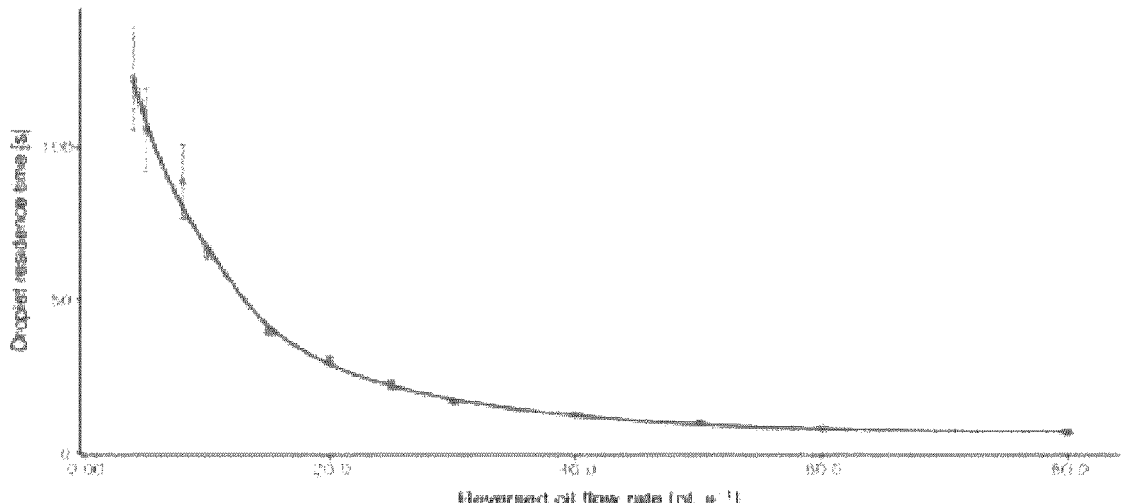

FIG. 33 is a graph showing the time for the last droplet (from trap 6) to leave the trapping array under different flow rates. At low flow rates (4-8 nL s$^{-1}$), residence time was highly variable. At high flow rates (>20 nL s$^{-1}$), all droplets were usually released within ~30 s. Droplet residence time is an important parameter for sorting droplets under flow reversal and for keeping desired droplets such that an automation sequence can be executed for these operations. One standard error, N=3 displayed.

Figure 34A:
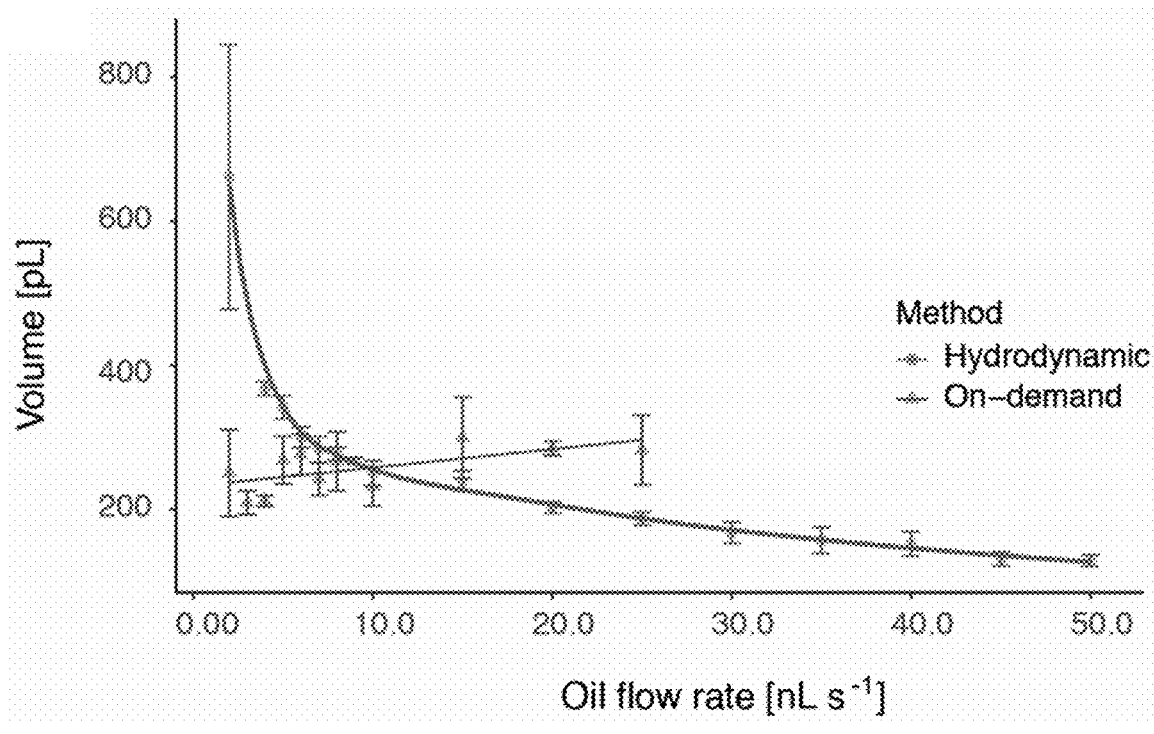
Figure 34B:
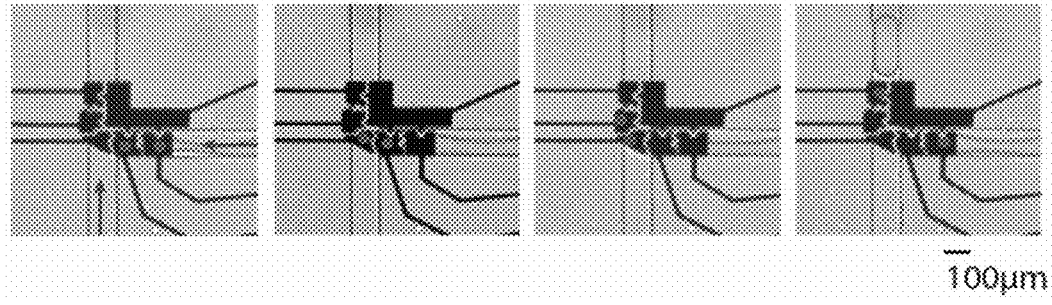

FIG. 34A is a graph of average droplet volume (in pL) of on-demand generated and hydrodynamically generated droplets. Droplets were generated with a double T-junction of 100 μm width. On-demand droplet-generation showed a linear relationship with respect to oil flow FIG. 34B is a sequence of images of electrodes being serially actuated to generate droplets on-demand at a potential of 126 V$_{RMS}$ and a frequency of 15 kHz (bright field image, 10×).

Figure 35:
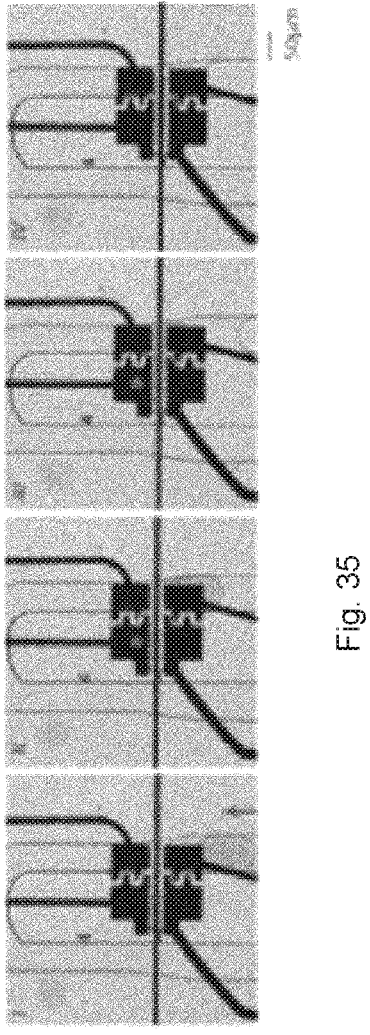

FIG. 35 is a sequence of images showing on-demand merging of two droplets at 4 nl s$^{-1}$ oil flow rate. The trapped droplet contains a single MCF-7 cell.

Figure 36A:
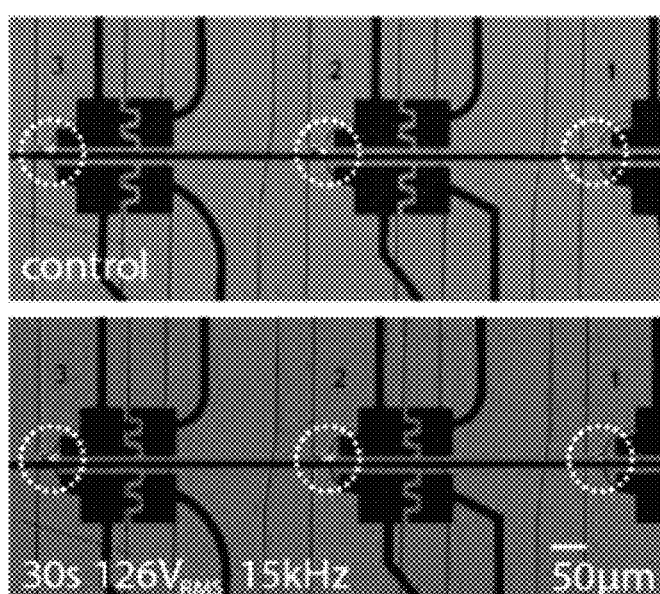

FIG. 36A shows trapped MCF-7 cells stained with FDA/PI after 10 min incubation on device (top), and after total actuation time of electrodes of 30 s (15 kHz, 126 V$_{RMS}$) and 10 min incubation on device (bottom). FDA stain reveals live cells and PI stain reveals dead cells.

Figure 36B:
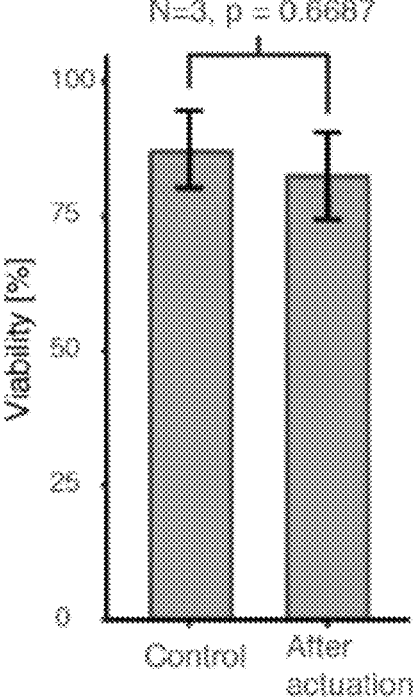

FIG. 36B shows a graph of viabilities indicating that no significant difference in viability can be detected between the control (87.5±7.2%) and after actuation of electrodes (82.5±8.1%) (unpaired two-sample T-test, P=0.6687, N=3).

Figure 37A:
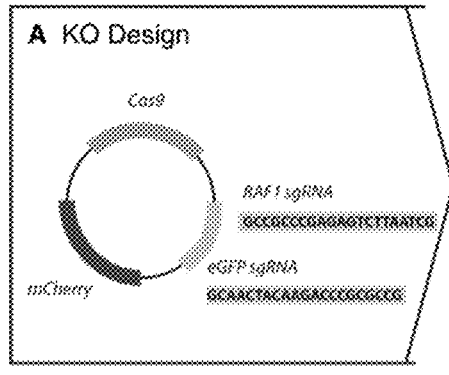

FIG. 37A shows a design of CRISPR-Cas9 based knock-out cell line using a transient plasmid expressing Cas9 and guide RNA (sgRNA).

Figure 37B:
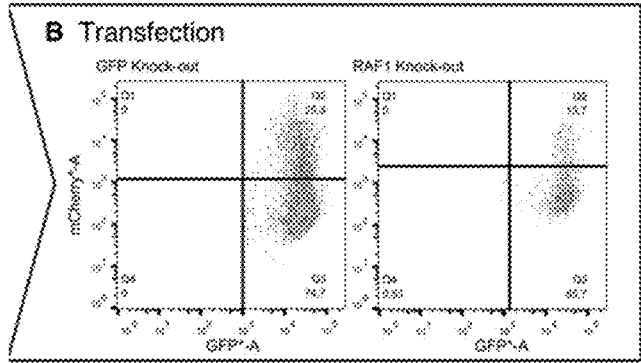

FIG. 37B shows flow cytometry indicating transfection efficiencies.

Figure 37C:
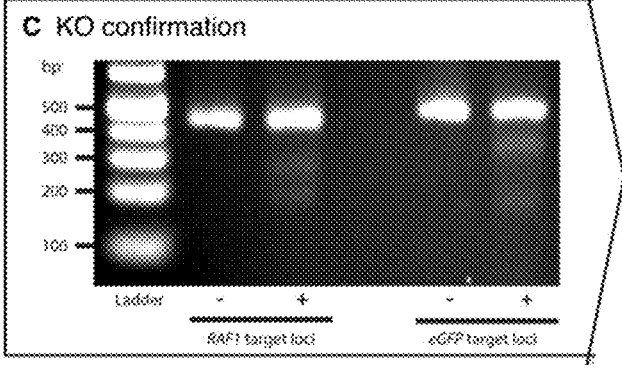

FIG. 37C shows knockout confirmation through a genomic cleavage detection assay.

Figure 37D:
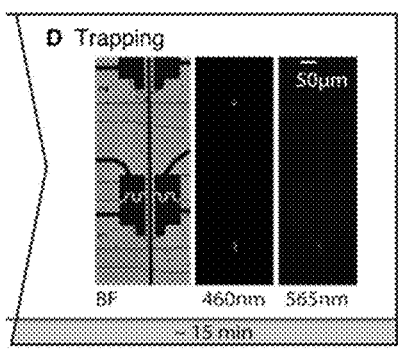

FIG. 37D shows H1299 cells (eGFP+) resulting from lipid mediated transfection were trapped and screened for mCherry expression (red). Trapped cells show successfully transfected cells expressing mCherry (red) and GFP (green) (trap 3) and a cell only expressing native GFP (green) (trap 2).

Figure 37E:
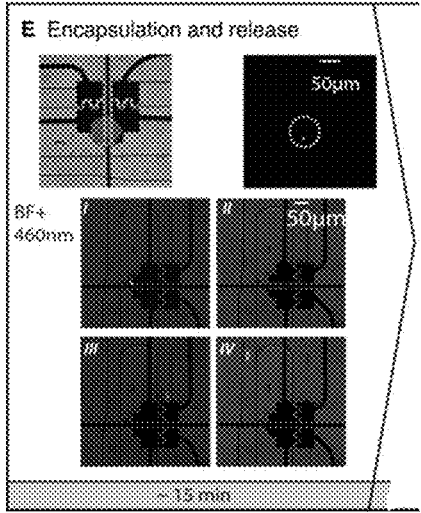

FIG. 37E shows the transfected isoclone was encapsulated and subsequently released on-demand towards the outlets (trap 3, frames of high-framerate video).

Figure 37F:
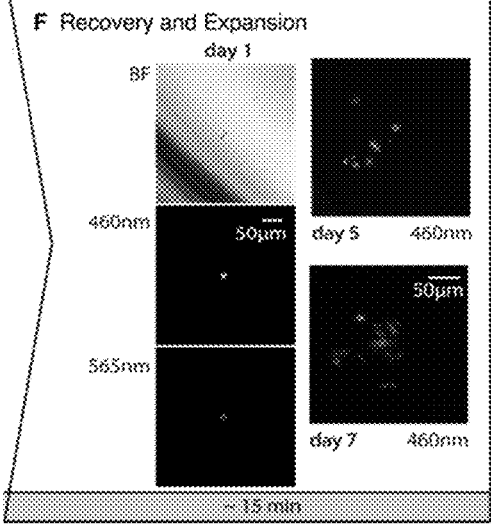

FIG. 37F shows the droplet containing the isoclonal cell is collected from the outlet into a capillary and recovered into a 96-well plate.

Figure 38A:
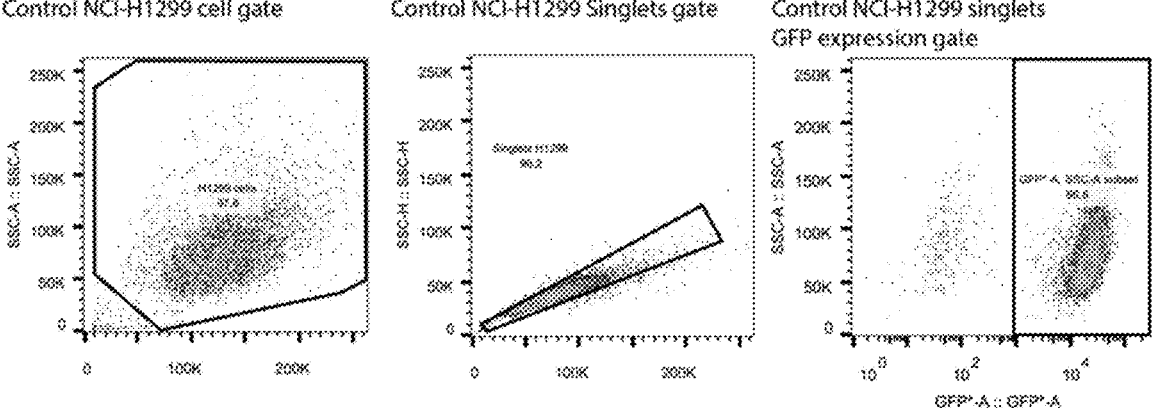

FIG. 38A shows a flow cytometry gating strategy demonstrated with untransfected NCI-H1299 cells.

Figure 38B:
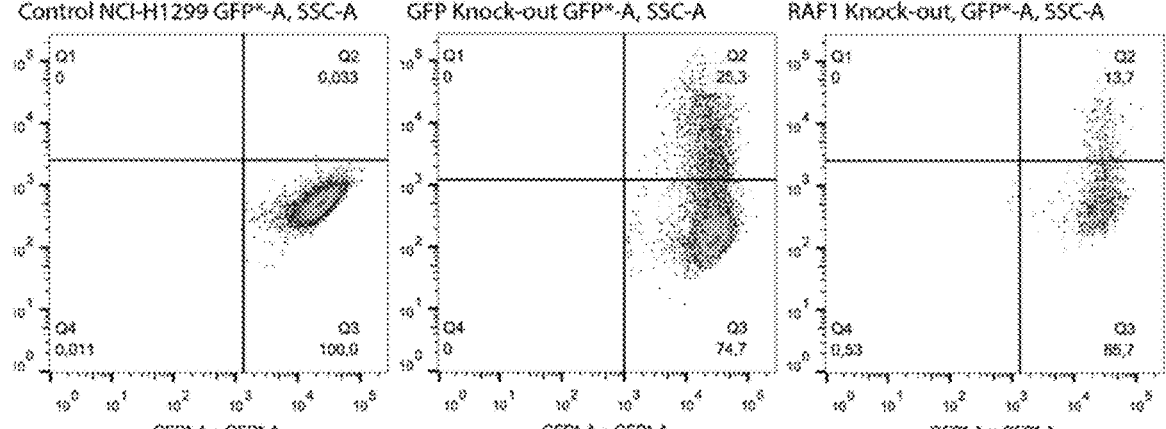

FIG. 38B shows flow cytometry scatter of mCherry vs. eGFP of control NCI-H1299 lung squamous cell carcinoma singlets (left); mCherry vs. eGFP of NCI-H1299 lung squamous cell carcinoma singlets transfected with a plasmid expressing an sgRNA directed to knock out the stably integrated eGFP cassette (middle; the determined transfection efficiency is 25.3%) and mCherry vs. eGFP of NCI-H1299 lung squamous cell carcinoma singlets transfected with a plasmid expressing an sgRNA directed to knock out the RAF1 oncogene (rights; the determined transfection efficiency is 13.7%).

Figure 39A:
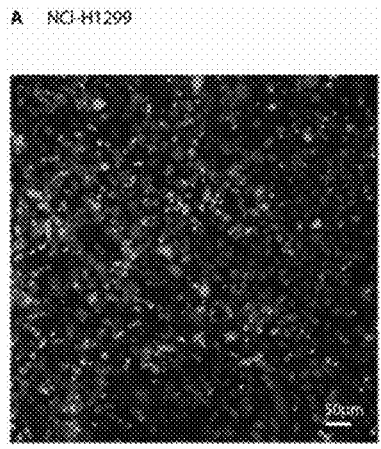

FIG. 39A shows NCI-H1299 cells containing eGFP integrated at the AAVS1 site.

Figure 39B:
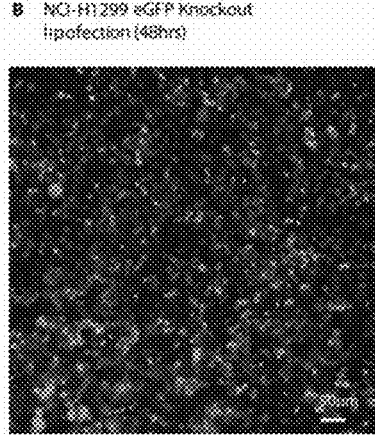

FIG. 39B shows NCI-H1299 cells 48 h after lipid-mediated transfection with eGFP targeting sgRNA encoding plasmid.

Figure 39C:
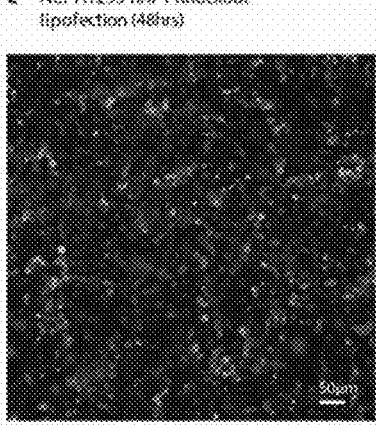

FIG. 39C shows NCI-H1299 cells 48 h after lipid-mediated transfection with RAF1 targeting sgRNA encoding plasmid. mCherry expression (IEx: 585 nm/IEm: 608 nm), native eGFP expression (Ex: 488 nm/IEm: 509 nm).

Figure 40:
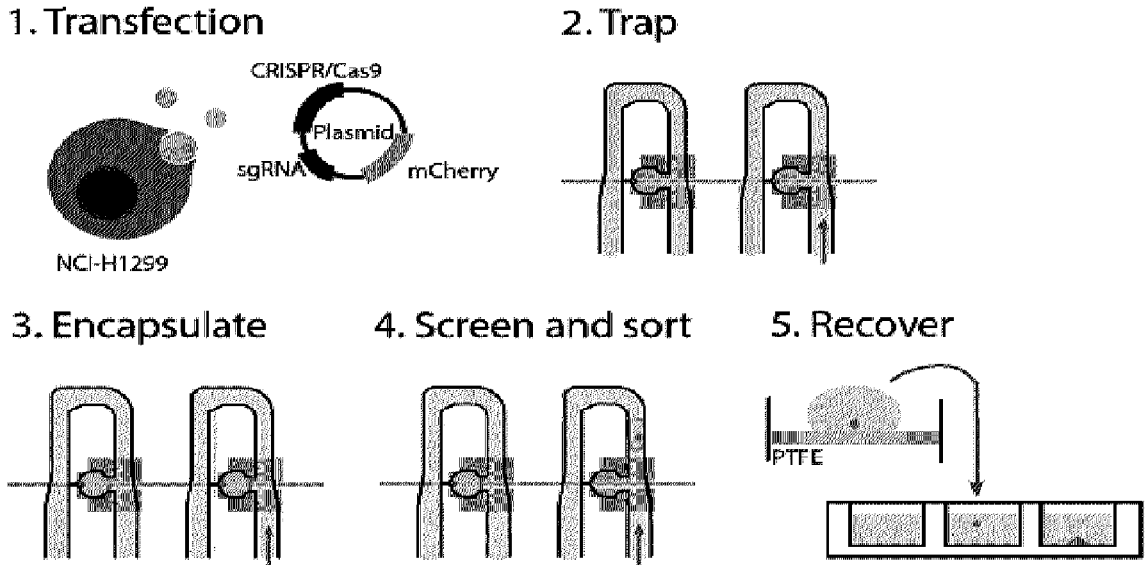

FIG. 40 is a schematic diagram showing, after transfection (1), the device was loaded with a heterozygous transfected cell suspension and single isoclones were trapped (2). An HFE-7500 2% Ran surfactant oil flow was flown through the device and electrodes were actuated in order to encapsulate single-cells in droplets (3). Single isoclone containing droplets could be selected and released on demand. After capillary recovery and centrifugation, isoclones were recovered in 96-well plates and maintained for expansion (4).

Figure 41A:
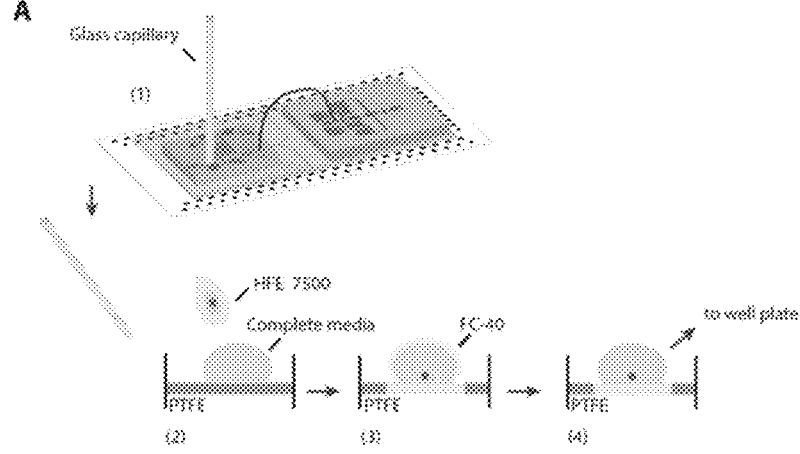

FIG. 41A shows a four step droplet isoclonal recovery procedure. (1) After on-demand release of an isoclone containing droplet from the device, an HFE7500 filled glass capillary was held on top of the outlet. (2) The capillary content was flushed out using FC-40, on top of a complete media droplet situated on top of a PTFE membrane. (3) The FC-40 further destabilized the surfactant held emulsion, and the oils were absorbed by the membrane. (4) The remaining media and single-cell containing droplet could be transferred to a culturing platform.

Figure 41B:
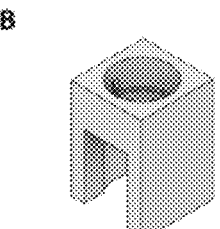

FIG. 41B shows a 3D printed PTFE membrane holder that provides for airflow and fast oil evaporation in a biosafety cabinet.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various systems and methods are described below to provide an example of at least one embodiment of the claimed subject matter. No embodiment described below limits any claimed subject matter and any claimed subject matter may cover systems and methods that differ from those described below. The claimed subject matter are not limited to systems and methods having all of the features of any one system and method described below or to features common to multiple or all of the systems and methods described below. Subject matter that may be claimed may reside in any combination or sub-combination of the elements or process steps disclosed in any part of this document including its claims and figures. Accordingly, it will be appreciated by a person skilled in the art that a system or method disclosed in accordance with the teachings herein may embody any one or more of the features contained herein and that the features may be used in any particular combination or sub-combination that is physically feasible and realizable for its intended purpose.

Furthermore, it is possible that a system or method described below is not an embodiment of any claimed subject matter. Any subject matter that is disclosed in a system or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should be noted that the term "coupled" used herein indicates that two elements can be directly coupled to one another or coupled to one another through one or more intermediate elements.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The inventors have developed a hybrid microfluidic device that provides on-demand generation of droplets, single particle trapping as well as encapsulation of single-particles. The microfluidic device can perform on-demand operations on droplets in channels. These on-demand operations include for example on-demand droplet generation through a T-junction droplet generator, merging droplets, trapping of droplets, selectively releasing or keeping droplets on device and merging droplets. This provides for the device to carry out single-cell trapping, analysis, controlled encapsulation of single-cells and/or release and trapping of single-cell containing droplets.

Accordingly, provided in an aspect is a microfluidic device. The device comprises a first layer including a plurality of electrodes (also referred to as the electrode layer). The device comprises a second layer disposed on top of the first layer, the second layer including a dielectric patterned over the electrodes (also referred to as the dielectric layer). A third layer is disposed on top of the second layer. The third layer includes a droplet generator for generating droplets of fluid and a serpentine channel with traps. The serpentine channel with traps includes a first inlet for receiving the droplets of fluid from the droplet generator; a second inlet for receiving particles in solution; a channel for carrying the droplets of fluid and/or the cells in solution from the first inlet and the second inlet, respectively, towards an outlet; one or more traps extending away from the channel, each trap configured to receive and retain cells in solution and droplets of fluid from the channel; and outlet channels.

For example, the channel is a serpentine main channel.

For example, the device may also include the droplet generator for generating droplets of fluid, the droplet generator being fluidly coupled to the first inlet of the trapping array.

For example, the first layer is an electrode layer including a plurality of electrodes that are co-planar and at least partially placed under the channels.

For example, the second layer is a dielectric material that acts as a capacitor.

For example, the third layer is made of a transparent material.

For example, the third layer is made of one of: polydimethylsiloxane (PDMS), a photoresist, poly (methyl methacrylate) (PMMA), a plastic, a polymer, silicon, glass, or a combination thereof.

For example, the first fluid is a single phase fluid.

For example, the second fluid is a single phase fluid or a bi phasic fluid.

For example, the first fluid and the second fluid are immiscible.

For example, the channel is configured to carry the first fluid and/or the second fluid past the one or more traps in two directions.

For example, each of the one or more traps include:
a first end fluidly coupled to the channel to receive the trapped element from the channel; and
a second end fluidly coupled to the channel downstream from the first end, the second end being configured to retain the trapped element from the channel.

For example, the trapped element is at least one particle.

For example, the trapped element is biological material, the biological material including one or more bacterial cells, human cells, mammalian cells, yeast cells, algae cells, plant cells, insect cells or fungal cells.

For example, the trapped element is a droplet.

For example, the droplet includes a particle content.

For example, the first end of the trap has a width greater than a diameter of the trapped element and the second end of the trap has a width about equal to the diameter of the trapped element.

For example, the width of the first end of the trap is about 50 μm to receive the trapped element from the channel.

For example, the width of the second end of the trap is about 8 μm to retain the trapped element in the trap.

For example, a resistance in the channel downstream of the first end of the trap is greater than or equal to a resistance through the trap, such that when the trapped element is in the trap, the resistance in the channel downstream of the first end of the trap is less than the resistance through the trap.

For example, the channel is positioned above one or more of the plurality of electrodes, and actuation of the one or more of the plurality of electrodes controls movement of one or more of the particles and/or a droplet of the first fluid from the first inlet or the second inlet, respectively, towards the outlet.

For example, actuation of the one or more of the plurality of electrodes controls movement of a particle from the first fluid when the one or more electrodes operate in a dielectrophoresis (DEP) mode by applying high frequency AC potentials to the electrodes or in an electrowetting mode by applying low frequency AC potentials to the electrodes.

For example, at least one of the electrodes acts as a grounding electrode and movement of droplets of the first fluid within the channel, into the channel, out of the channel, or maintains the droplets within the channel.

For example, the trap is positioned above one or more of the plurality of electrodes, and actuation of the one or more of the plurality of electrodes controls movement of the trapped element into, out of and/or within the trap.

For example, a droplet generator is positioned over one or more electrodes of the plurality of electrodes of the first layer and is configured to generate a droplet based on coordinated actuation of the one or more electrodes, by moving an aqueous single phase into a pressure driven oleophilic phase.

For example, the droplet generator is a T-junction droplet generator.

In an embodiment, each of the one or more traps include:
a first end coupled to the channel to receive cells in solution and droplets of fluid from the channel; and
a second end coupled to the channel downstream from the first end, the second end being configured to retain configured to retain cells in solution and droplets of fluid from the channel.

For example, the first end has a first width greater than a diameter of the cell and the second end has a second width about equal to the diameter of the cells.

For example, the first end of the trap has a width of about 50 µm to receive cells in solution and droplets of fluid from the channel.

For example, the second end of the trap has a width of about 8 µm to retain cells in solution in the trap.

For example, the channel is positioned above one or more of the plurality of electrodes and actuation of the one or more of the plurality of electrodes controls movement of the droplets of fluid and/or the cells in solution from the first inlet and the second inlet, respectively, towards the outlet.

For example, the trap is positioned above one or more of the plurality of electrodes and actuation of the one or more of the plurality of electrodes controls movement of the droplets of fluid and/or the cells in solution into the trap.

For example, the droplet generator is positioned over one or more electrodes of the plurality of electrodes of the first layer and is configured to generate a droplet based on coordinated actuation of the one or more electrodes.

For example, the droplet generator is a T-junction droplet generator.

For example, the third layer comprises or is made of polydimethylsiloxane (PDMS) material.

For example, the first layer comprises a glass substrate on which pads that act as the location for the application of potentials, wirings, and pads that act as the plurality of electrodes are positioned, any one or more or all of which is optionally a chrome layer.

For example, the second layer is made of or comprises SU-8 photoresist material.

In one embodiment, the first and second layers are fabricated on top of each other, optionally by standard photolithography.

In one embodiment, the third channel layer is fabricated in PDMS by soft lithography. Standard photolithography may be used to produce a mold, on which PDMS may be poured, hardened and removed (method called soft lithography).

The on-demand droplet generating platform comprises enclosed channels in which droplets may be manipulated by actuating a series of electrodes placed on the electrode layer (or digital microfluidic layer). As such, droplet operations can be performed. In some embodiments, the on-demand droplet generator electrodes are used to generate electrostatic force which pulls on the aqueous phase, and pulls it towards the oil phase, where it eventually is sheared off into a droplet.

Figure 1:
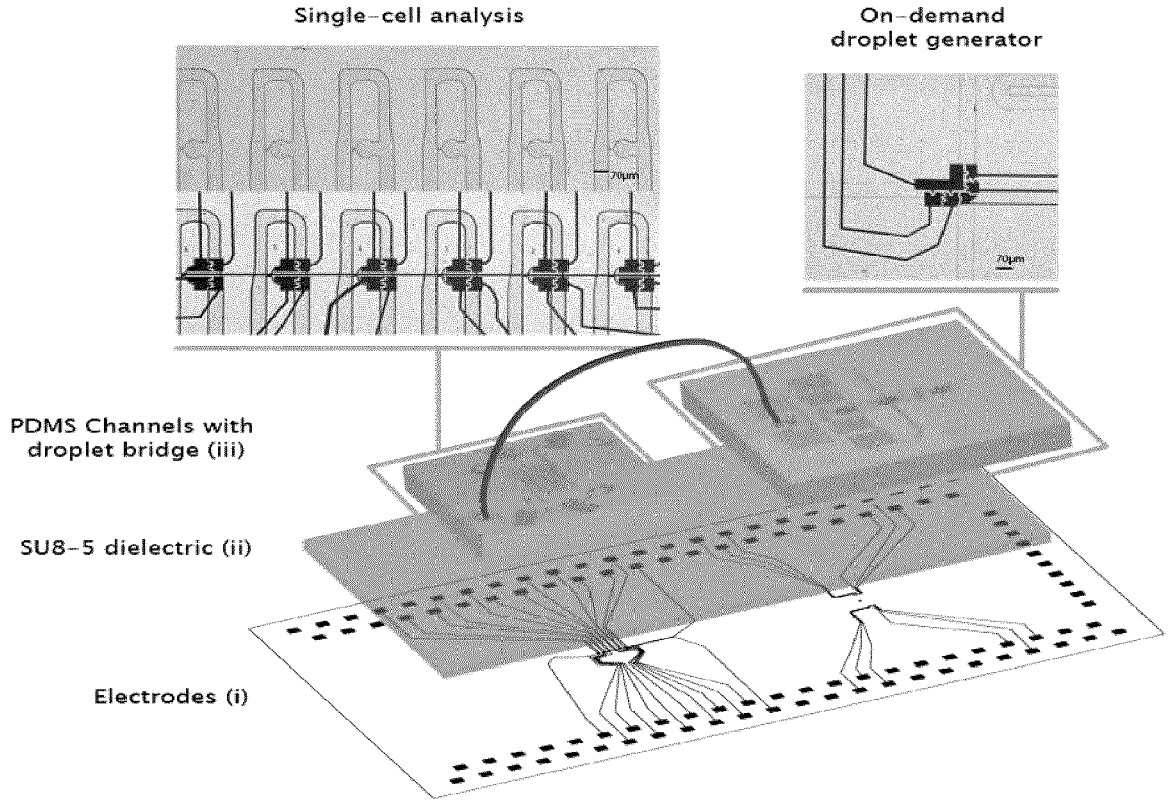
FIG. 1 is an exploded view of the microfluidic device showing the three layer overview, in accordance with to an embodiment.

Referring now to FIG. 1, an integrated droplet digital device for on-demand single-cell encapsulation and analysis is shown. The device comprises a channel layer made of for example polydimethylsiloxane (PDMS) material. The channels defined within the channel layer generally have a height of about 35 µm and width of about 50-75 µm. The device also comprises a dielectric layer and a digital microfluidic layer comprising a plurality of electrodes. The dielectric layer is made from for example negative SU-8 5 photoresist, which acts as a capacitor over which the potential, coming from the chromium electrode on glass layer underneath, drops.

For example, an electrode can receive an AC potential of varying frequency and voltage, which will drop over, partially drop over, or cross the dielectric layer, resulting in electrowetting, electrostatic forces or dielectrophoresis (DEP). In one embodiment, this potential can be about 15 kHz, 126 $V_{RMS}$.

The channel layer comprises an on-demand droplet generator platform and a single-cell trapping array platform. The on-demand droplet generator may contain two T-junction droplet generators (see upper right image of FIG. 1), for example, under which several electrodes are located for on-demand droplet generation (i.e. due to its lining with electrodes the T-junction can generate droplets on demand). The single-cell analysis (SCA) portion or cell trapping array (BF, 10×) comprises for example four inlets/outlets: one for oil and droplets, one for cells and priming solution, one for waste, and one for sample recuperation and flow reversal. The trapping area contains cell traps of 8 µm, under which 4 electrodes are located. The droplet generator and the cell trapping array are connected with for example polyetheretherketone (PEEK) tubing.

Figure 2A:
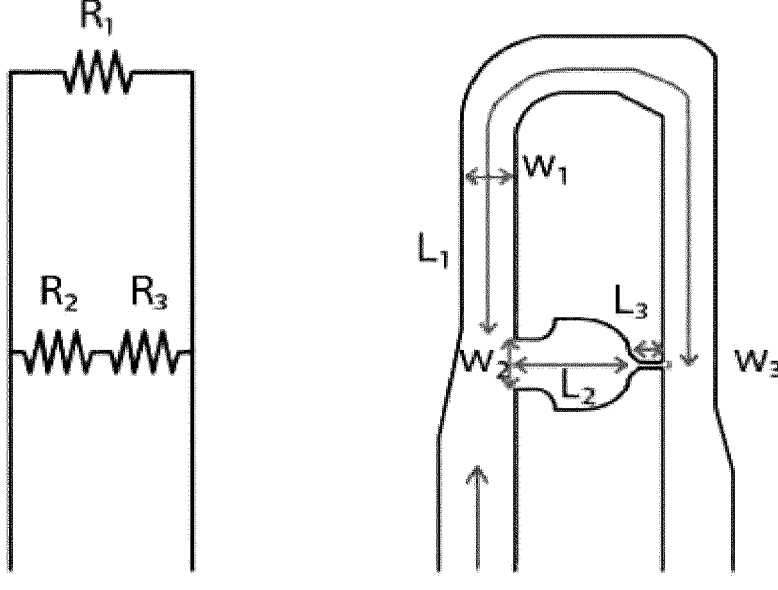
FIG. 2A is a series of drawings showing the overlay of a resistor diagram on the single-cell analysis device.
Figure 2B:
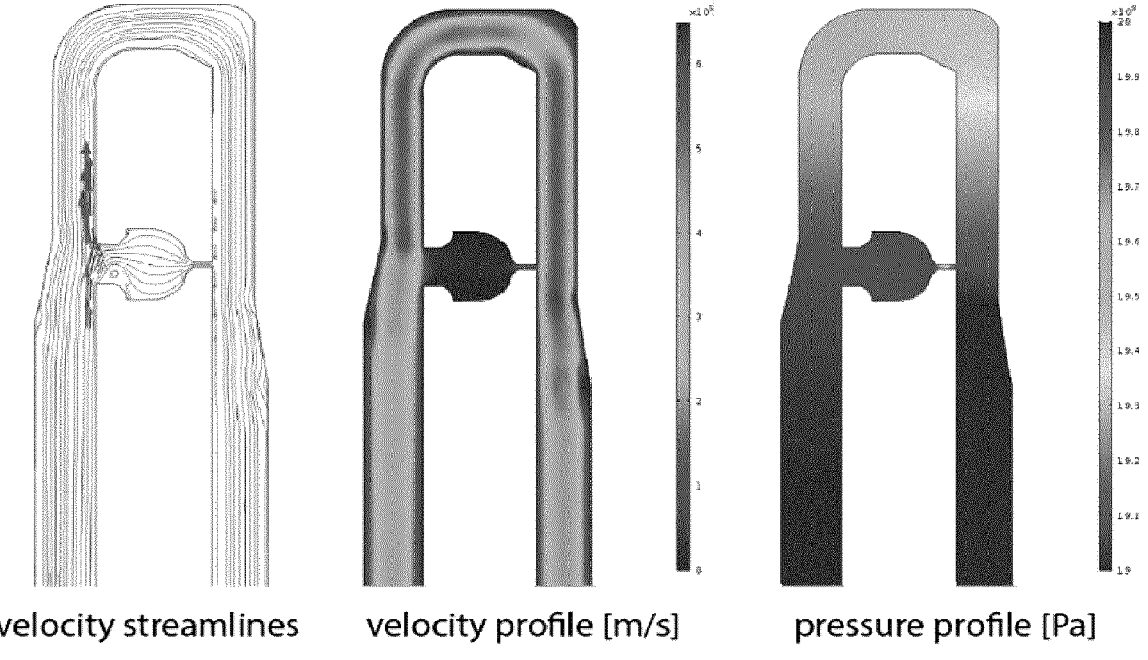
FIG. 2B is a series of images showing velocity streamlines, velocity profile and pressure profile across trapping array.

The resistance-based serpentine channel design of the cell trapping array is further detailed in FIGS. 2A and 2B. The cell trapping array may include a plurality of serpentine loops such as the serpentine loop shown in FIGS. 2A and 2B. Further, it should be understood that the serpentine loop shown in FIGS. 2A and 2B are one example of a shape of a serpentine loop. Other shapes and dimensions of serpentine loops may also provide for trapping cells and/or droplets. In this example, hydrodynamic resistance in the cell trap R3 generally increases upon trapping a cell. The flow of fluid through the channel generally prefers the path of least resistance and the bypass path R1 is preferred. Length L1 and width W1 of the bypass are 1000 µm and 50 µm, respectively; length L2 and L3, and width W2 and W3 of the cell trap are 90 µm, 25 µm, 50 µm and 8 µm, respectively. FIG. 2B is a series of images showing flow stream pattern across a serpentine loop of a trapping array, as conducted using numerical simulations with the COMSOL Multiphysics software. Accordingly, the resistance-based channel design creates trapping environments that allow channels to trap single particles of about 12-25 µm or 12-30 µm. In order to trap a single cell, for example, an oil-phase flow (around 4 pL/s) is injected into the device. As the oil flows around a serpentine loop, a high voltage is sent to an electrode in the rear end of the trap. The trap is "wetted", the oil flow will cut off a droplet inside the trap, moves on and leaves behind a droplet (e.g. a 172 pL droplet).

Figure 3A:
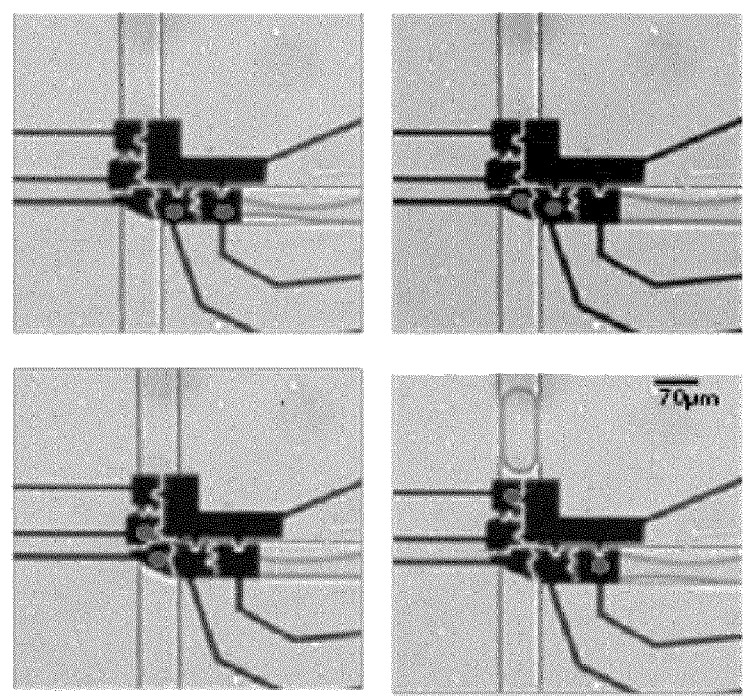
FIG. 3A is a series of images showing T-junction channels where electrodes being actuated in a serial fashion to generate droplets on-demand under 15 kHz and 1.6 Vpp (126 $V_{RMS}$) (bright field image, 10×).
Figure 3B:
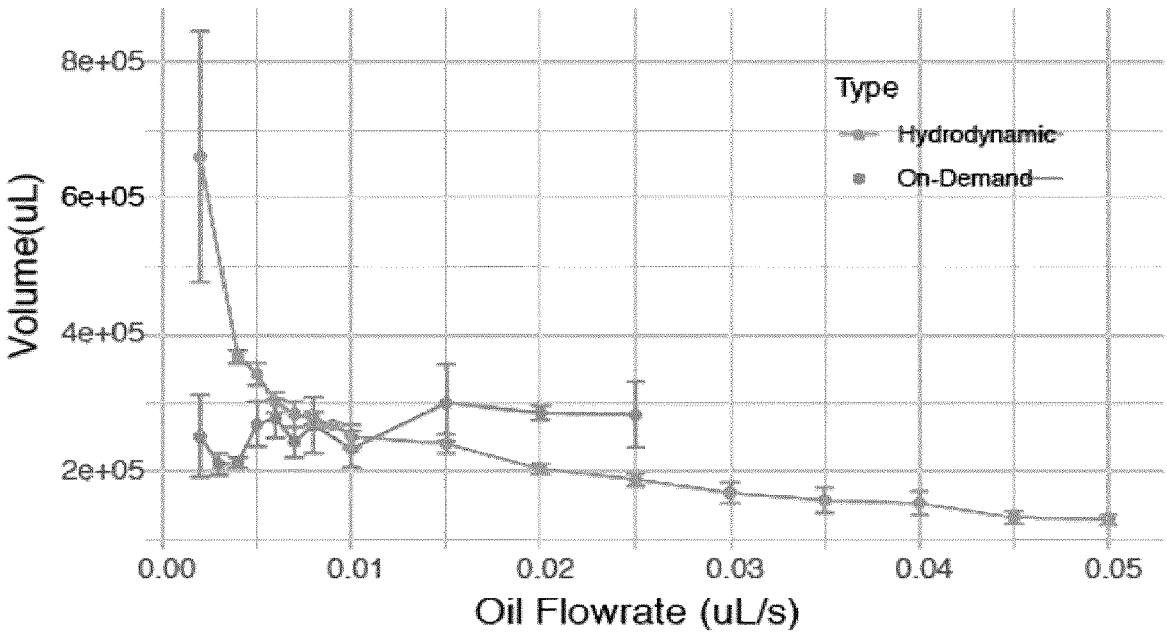
FIG. 3B is a graph showing the average droplet volume as a function of oil flowrate of on-demand generated and hydrodynamically generated droplets.

Now, referring to FIGS. 3A and 3B, on-demand droplet generation is described in more detail. As shown in FIG. 3A, the electrodes positioned at T-junction channels are actuated (as shown by red dots) in a serial fashion to generate droplets on-demand under 15 kHz and 1.6 $V_{pp}$ (126 $V_{RMS}$) (bright field image, 10×). The electrodes are coplanar and are actuated sequentially, two by two, in order to move the aqueous flow into the oil flow. Droplets are generated with a double T-junction of 70 μm width. As shown in FIG. 3B, on-demand droplet-generation provides stable droplet volume for on-demand droplet generation of 0.0002075 μL droplets. Droplet volume was calculated using Fiji (ImageJ) and a channel height of 35 μm. Droplets arriving through the droplet bridge in the SCA platform, remain the same volume as droplets made in the droplet generator (n=12, Student T-test, P 0.05). Using this on-demand method, droplets can be created a-periodically and on-request.

Figure 4A:
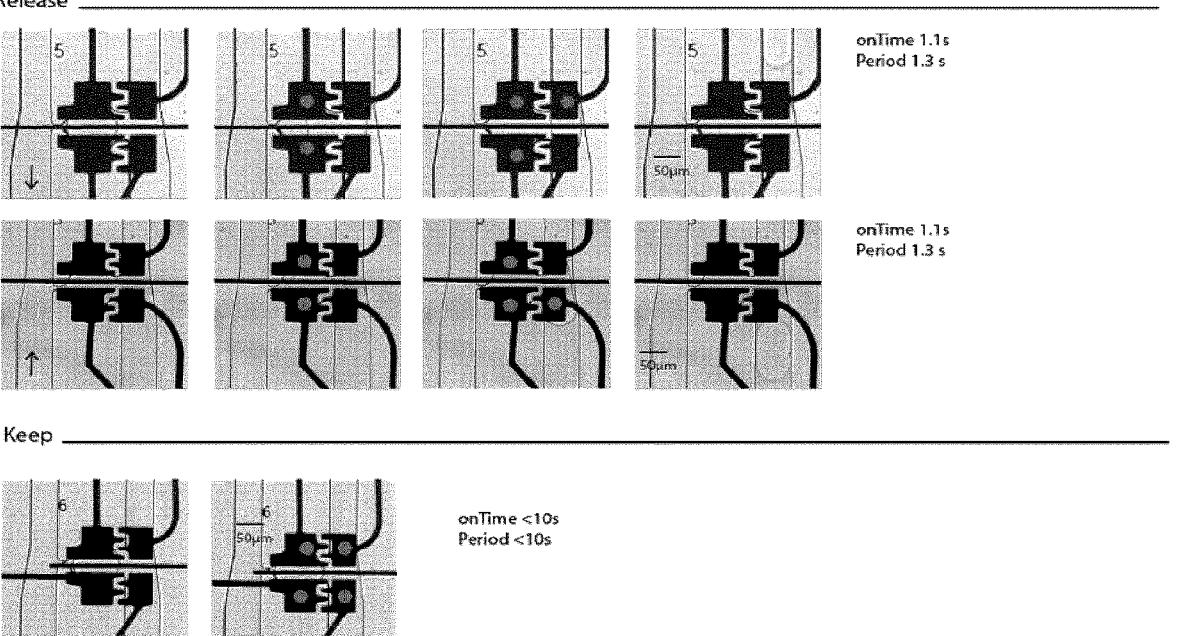
FIG. 4A is a series of images depicting droplet operations on a device. Electrodes indicated with a red dot are actuated, others are ground.
Figure 4B:
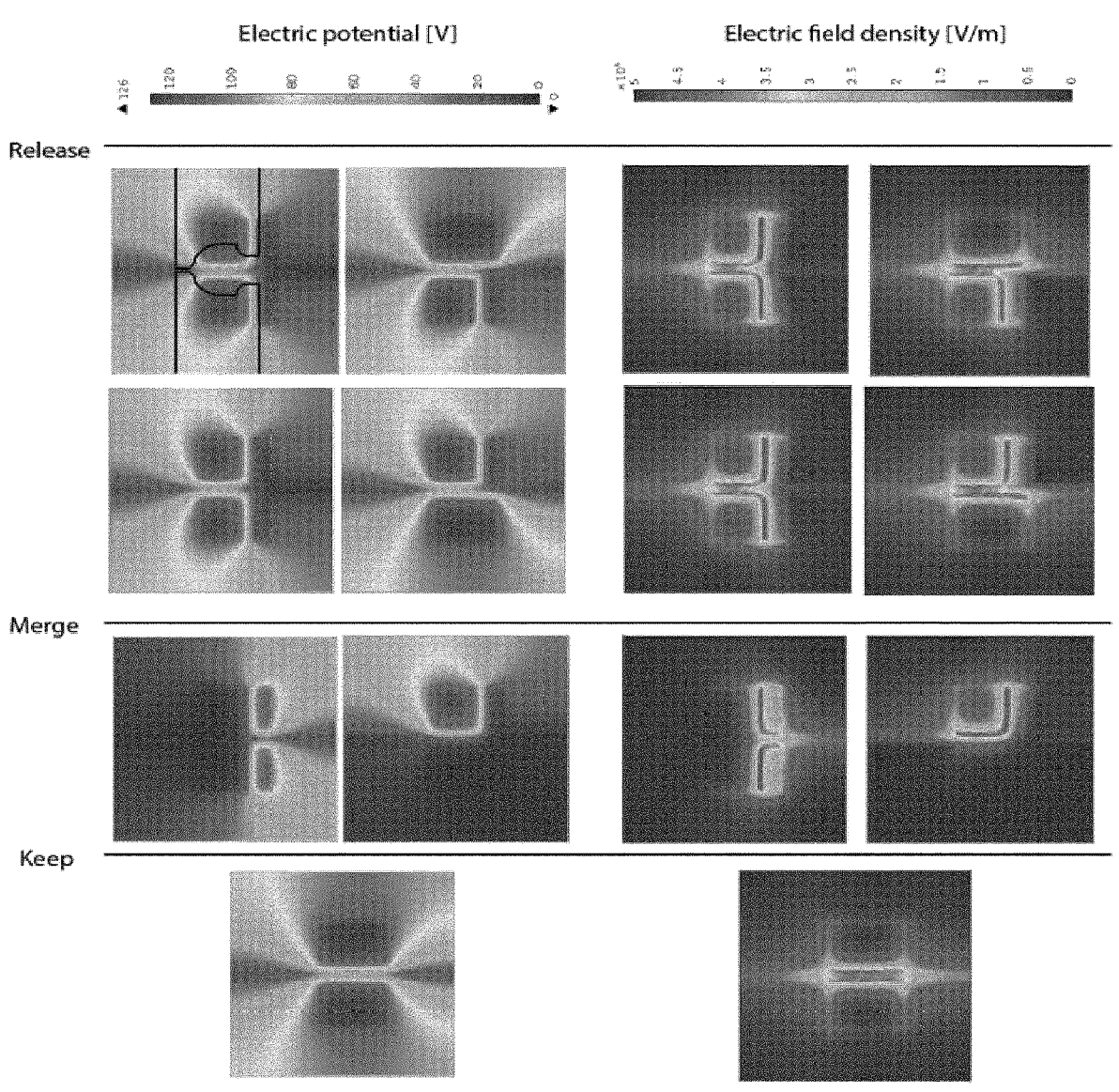
FIG. 4B is a series of heat maps showing electrode actuation pattern for on-demand droplet operations, and resulting electric field density.

Referring now to FIG. 4A, the on-demand droplet operations of releasing and keeping droplets are illustrated. Electrodes shown with a red dot are actuated, the others are ground. The corresponding electric potential and electric field density during releasing and keeping of droplets are illustrated in FIG. 4B.

Figure 5A:
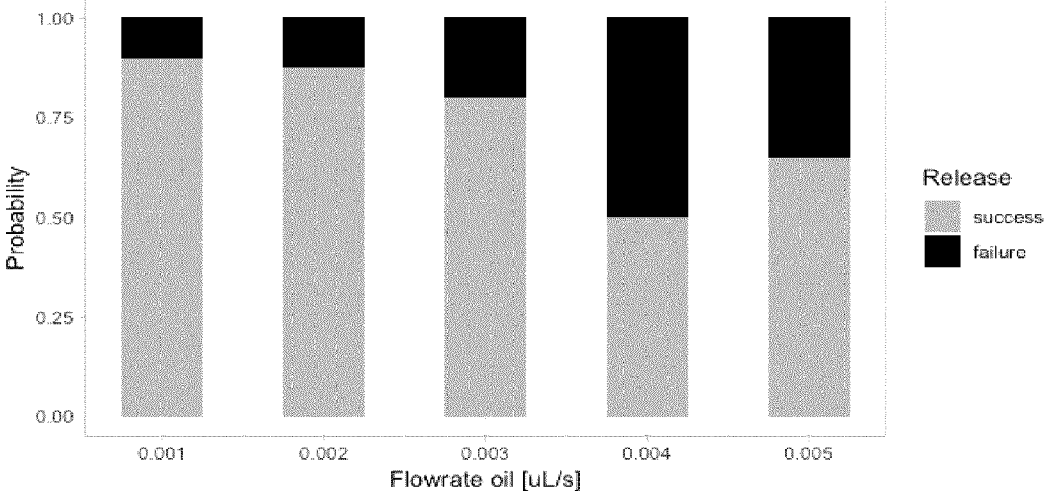
FIG. 5A is a bar graph showing probability of on-demand droplet release as a function of oil flowrate (n=80 per flowrate) (15 kHz, 126 $V_{RMS}$).
Figure 5B:
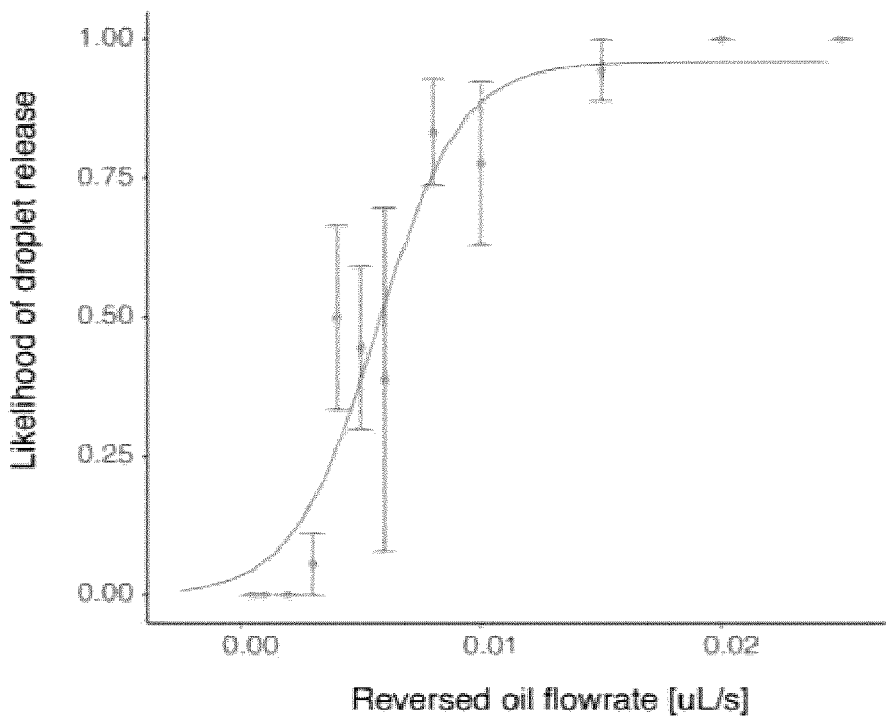
FIG. 5B is a graph showing probability of droplet release towards the inlets, hydrodynamically, as a function of oil flowrate, when the oil flow direction is reversed. With on-demand release under reversed flow rates droplet show efficient release with flow rates as low as (n=20) (15 kHz, 126 $V_{RMS}$).
Figure 5B:
Figure 5B:
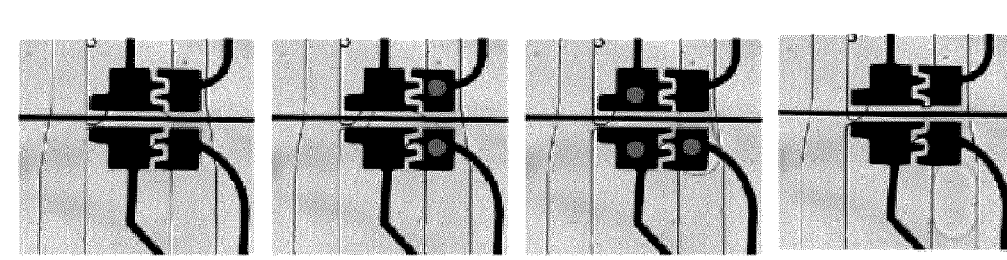
Figure 5C:
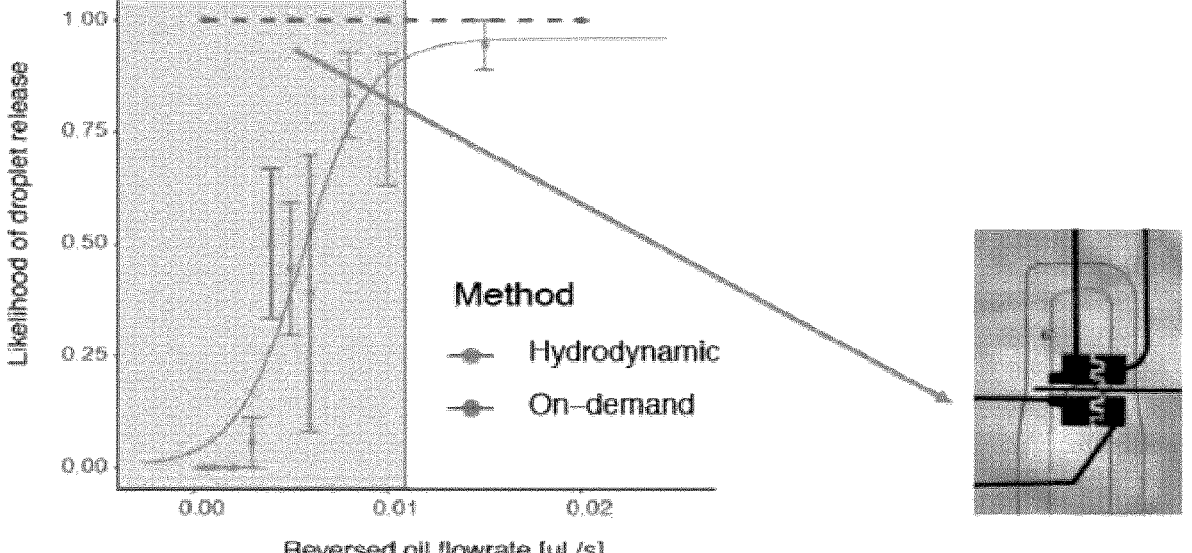
FIG. 5C is a graph showing that the efficiency of keeping droplets under flow rate. When the flow direction is reversed, droplets can be kept efficiently for flow rate lower than 0.05 μL/s with actuation for 10 seconds (15 kHz, 126 $V_{RMS}$)
Figure 5D:
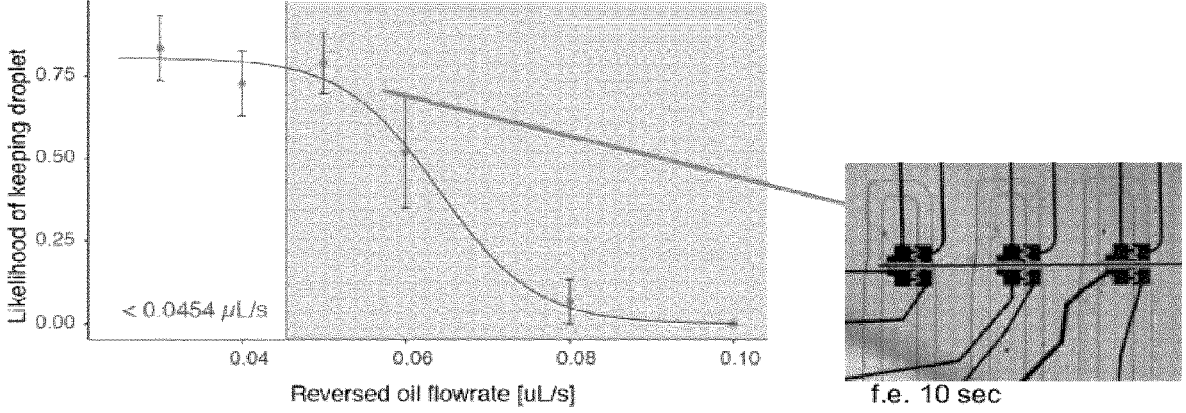
FIG. 5D is a graph showing the likelihood of keeping the droplet as a function of reversed oil flowrate.
Figure 5D:
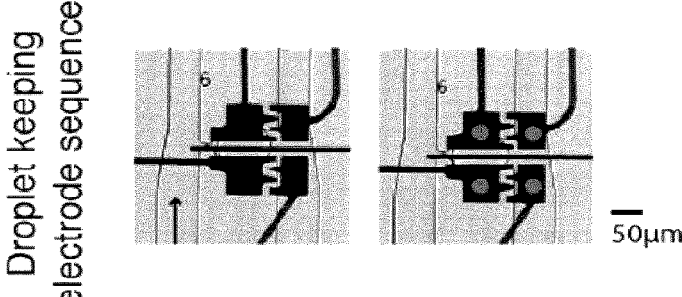
Figure 5E:
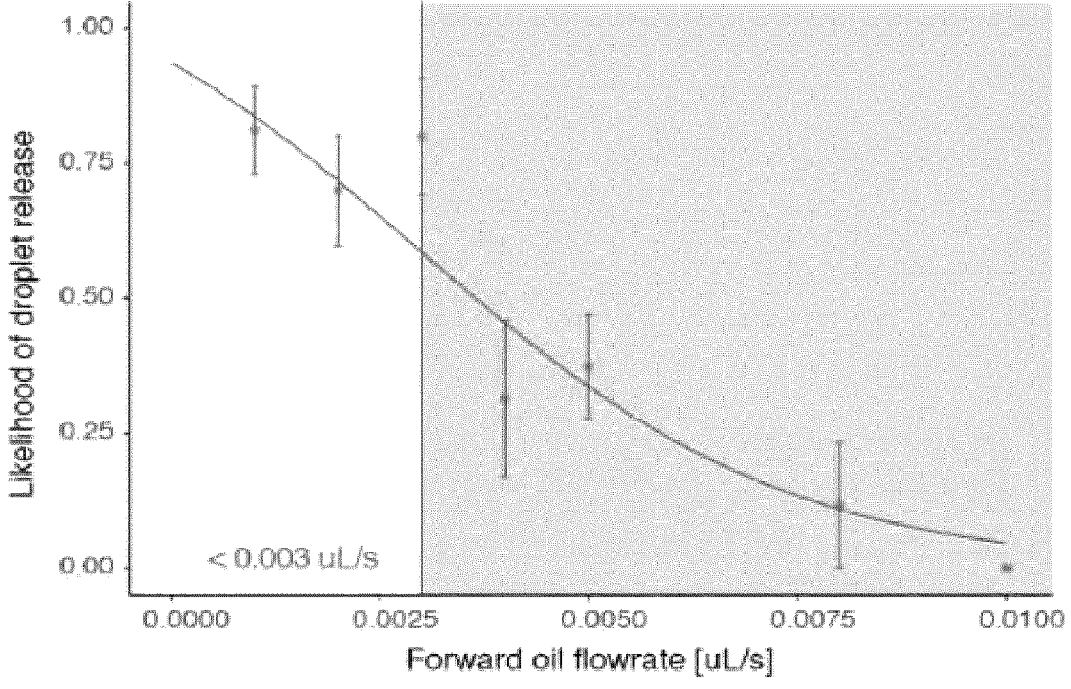
FIG. 5E is a graph showing the likelihood of droplet release as a function of forward oil flowrate.
Figure 5E:
Figure 5E:
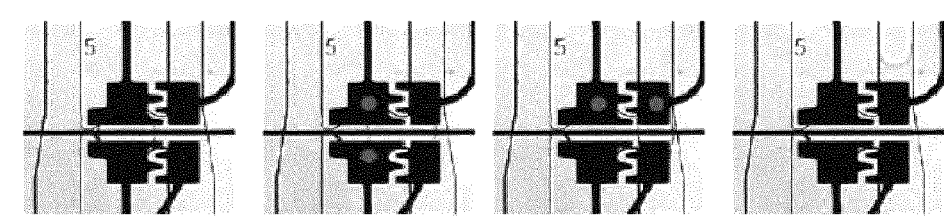
Figure 5F:
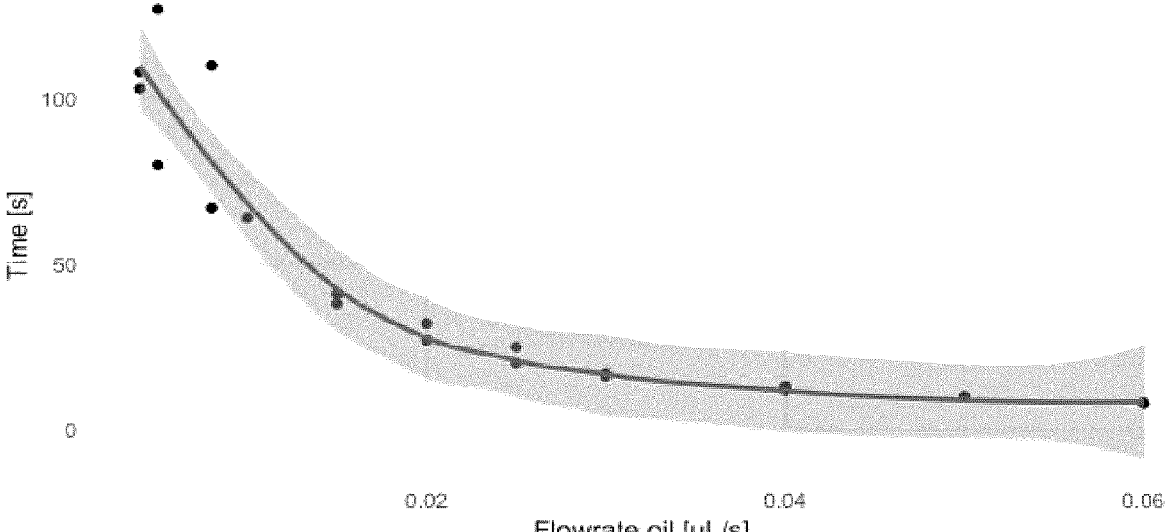
FIG. 5F is a graph showing the time required for the last droplet to exit the trapping array, as a function of oil flowrate, indicating how long droplets should be kept on chip for sorting purposes.

On-demand droplet operations are further characterized in FIG. 5A to 5F. It was shown that under increasing flowrates, on-demand release of the droplets toward the outlets becomes less efficient (n=80 per flowrate) (15 kHz 126 $V_{RMS}$) (FIG. 5A). However, by reversing the oil flow direction, from outlet towards inlet, under increasing flow rate, droplets are released more efficiently towards the inlets, hydrodynamically (FIG. 5B) with flow rates as low as about 0.05 L/s with actuation for 10 seconds (n=20) (15 kHz 126 $V_{RMS}$), for example. It was also found that when reversing the flow inside the channel but remaining the rate below a threshold, the droplets will remain in the trap. In this case, to remove the droplets from the traps, the flow is reversed by actuating the electrodes. As shown in FIG. 5C, even under low flow rates, the droplets will leave trap using the on-demand method, in contrast with the hydrodynamic method. When desirable, droplets may be kept in the traps by actuating all 4 electrodes, as shown in FIG. 5D. Even at higher reversed flow rates up to 0.045 μL/s (124 $V_{RMS}$), the droplets can be kept within the traps. Referring now to FIG. 5E, under forward flow from inlet to outlet, in the absence of electrodes, the droplets can optionally trap themselves, but have no option to return to the main channel. This can be made possible by actuating the electrodes at a low flow rate (e.g. less than 3 pL/s). FIG. 5F is a graph showing the time it takes for the last droplet to exit the trapping array, providing an indication of how long droplets should be kept on the chip for sorting purposes.

In an embodiment, the on-demand droplet generator platform described herein may include the platform as described in Ahmadi et al., An integrated droplet-digital microfluidic system for on-demand droplet creation, mixing, incubation, and sorting. Lab Chip, 19, 523-535, 2019, hereby incorporated herein by reference in its entirety. FIGS. 20 and 21 show images of the microfluidic array and of the on-demand droplet generation described in Ahmadi et al. Lab Chip, 19, 523-535, 2019.

The ground electrode may be any electrode (not fixed) in any orientation with the channel and can be obtained by either pulling an electrode that is off to ground, or by floating that electrode.

In an embodiment, the co-planar ground electrode is at least a single wire shared between all electrodes, going through the middle of these electrodes.

In an embodiment, one or more of the plurality of electrodes is used to keep the droplets in a fixed position in channels (e.g. in a trap) under flow rates up to, for example, 0.05 uL/s.

In an embodiment, one or more of the plurality of electrodes is used to keep droplets in a fixed position in channels (e.g. in a trap) under flow rates up to, for example, 0.05 uL/s, and subsequently release them on-demand.

In an embodiment, one or more of the plurality of electrodes is used to release droplets from a trap, optionally under flow rates up to 0.005-0.008 μL/s.

In an embodiment, one or more electrodes is used to release droplets from a trap, bi-directionally under both forward and reverse flows.

Figure 7:
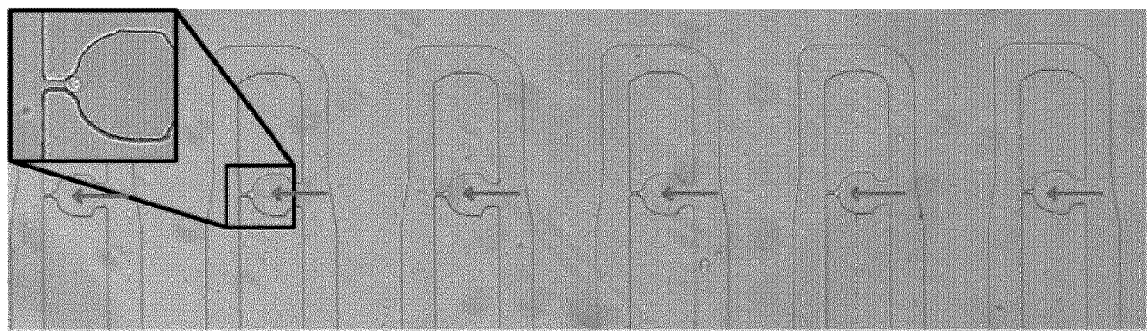
FIG. 7 is an image showing trapping of single MCF-7 breast carcinoma cells with aqueous phase of 0.001-0.004 μL s$^{-1}$.
Figure 8:
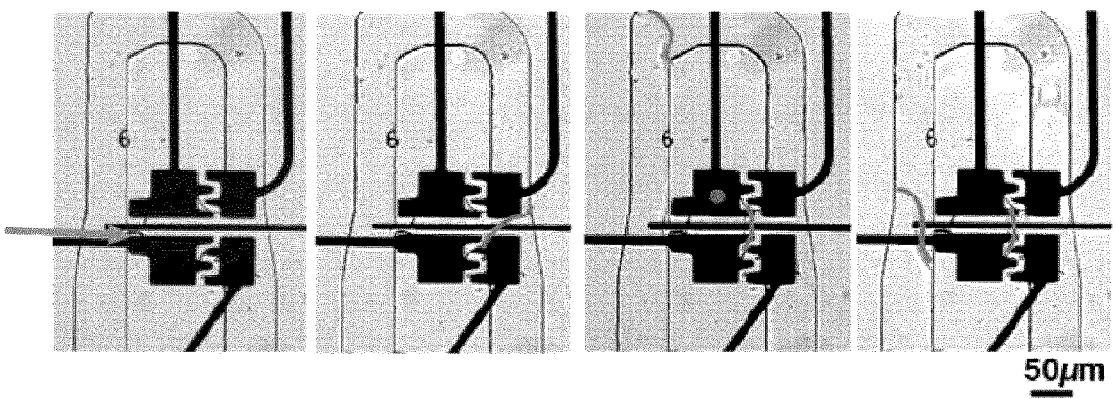
FIG. 8 is a series of images showing on-demand encapsulation of single cells in approximately 175 μL droplets.

The microfluidic device herein described may perform complex single-cell assays. In one example, the channel layer is produced in such way that particles between about 12-30 μm may be captured in traps. These particles may be single cells, for example mammalian cells (e.g. MCF-7 breast cancer cells, or H1299 lung squamous carcinoma cells) suspended in an aqueous phase, as shown in FIG. 7. By changing the aqueous phase into an oil phase, cells can be encapsulated in droplets in the traps (as shown in FIG. 8). Next, aqueous droplets in oil can be generated on-demand with a T-junction and brought into the trapping area. Various droplet operations can be performed using newly generated droplets, or the encapsulated cell droplets. By controlling these droplet operations, single cells can be screened and sorted, by selectively keeping or releasing droplets off chip.

In one embodiment, the microfluidic device can be used for single cell analysis, for cell sorting, e.g. sorting gene edited cells, and/or for expanding isoclonal populations.

Also disclosed herein are methods of producing the microfluidic device components.

In one example, the top layer (channel layer) of the device is made by soft-lithography of PDMS (polydimethylsiloxane) material. This layer is produced in a separate fabrication procedure, and bonded to the chip afterwards. The bonding of this layer to a SU8-5 photoresist layer (dielectric layer) may include plasma oxygen treatment, bonding and baking under pressure. The SU-8 5 photoresist layer and the chromium electrode layer (i.e. first layer) may be made using standard photolithography methods.

In some examples, whenever flow through the traps is blocked by a particle and an oil phase with 2% surfactant is introduced in the device, this provides for aqueous droplets to be generated in traps. In an embodiment, a hydrophobic surface treatment may be performed on the device using an ether-based PEG surfactant, for example, that provides for rapid drying and the user not having to flush the device. This surface treatment increases the contact angle with the oil flow, facilitating its movement through the channel. It also decreases the contact angle with aqueous solutions, helping in preventing droplet breakup.

In one embodiment, the device channel layer comprises two disconnected channel parts physically separated by an external capillary tubing that connects them.

For example, the first portion of the channel layer is a single cell analysis platform comprising traps that rely on hydrodynamic focusing, resistance and streamline based design, to trap single particles and droplets. The traps are placed in a symmetric serpentine with two inlets and two outlets. An electrode layer (i.e. first layer) positioned below a dielectric layer (i.e. second layer), can affect droplet movement in this channel layer.

In an embodiment, the single cell analysis platform is designed to cooperate with the chip electrode architecture positioned underneath it. The electrode design in the single cell analysis platform comprises a co-planar ground electrode that is a single wire going through the middle of electrodes. This particular electrode configuration also allows merging, releasing, keeping and trapping droplets.

On-demand droplet generation is also actuated by electrodes. By actuating electrodes placed under a T-junction channel, droplets of similar volume over different oil flowrates can be generated. Due to the constant volume, software can calculate the depletion of the aqueous stream, and can resupply the necessary amount of aqueous phase. This replenishing system allows for higher throughput droplet generation.

In one specific example, on-demand droplet operations are carried out as follows:

Droplet generation: Droplets can be generated on-demand.

Merging: Droplets going through the trapping array can be merged with droplets located in traps. Cell containing drops can be merged with other droplets.

Incubation: Droplets can be selectively pulled into traps, and kept into traps.

Sorting: Droplets can be selectively released out of a trap in two directions depending on the fluid flow. Droplets can be selectively kept in traps by actuating electrodes while reversing the flow. Droplets can for example be sorted based on their content (cells of a specific subtype, fluorescence, . . . )

Yet another aspect provided herein relates to a method of encapsulating a cell in a fluid droplet, the method comprising:

receiving a solution of cells by a channel of the microfluidic device;

directing the solution of cells towards a trap of the microfluidic device;

retaining one of the cells in the trap, the trap positioned above a plurality of electrodes;

receiving droplets of a second fluid such as but not limited to an oil by the channel of the microfluidic device;

directing the droplets of fluid towards the trap of the microfluidic device;

as the second fluid reaches the trap of the microfluidic device, actuating one or more electrodes positioned underneath the trap to maintain the first fluid and particle within the trap and generate the droplet of the first fluid containing the particle within the second fluid; and directing the one of the cells in the trap towards the one of the droplets of fluid in the trap to encapsulate the cell in the droplet of fluid.

For example, the methods disclosed herein are useful for single cell analysis, for cell sorting, for clonal selection e.g. sorting gene edited cells, and/or for expanding isoclonal populations.

Figure 6:
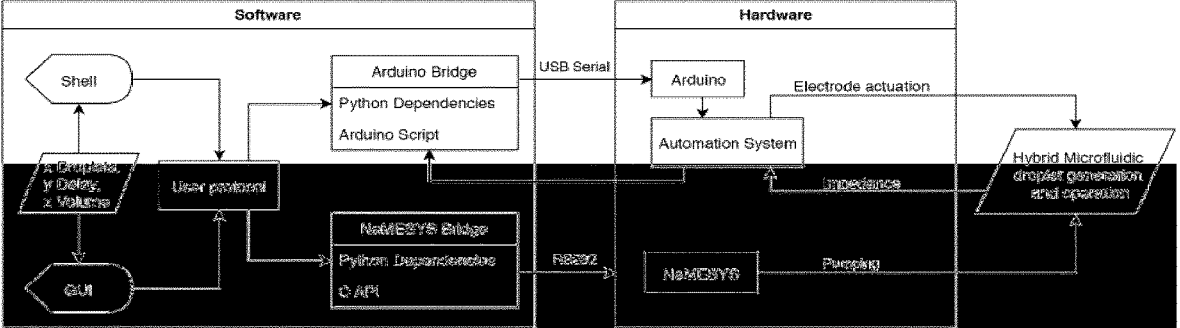
FIG. 6 is a flow diagram of the software/hardware used in hybrid microfluidic droplet generation and operation, according to an embodiment.

Another aspect described herein relates to an integrated system comprising the microfluidic device herein described and well as software and hardware for droplet generation and operation. In one embodiment, the hardware setup is as follows: chip observation takes pace under a microscope; an automation system comprising function generator, high-voltage amplifier and microcontroller controls actuation of electrodes; a syringe pump system controls flow in channels; a pogo-pin holder connects the chip to the automation system. A python control system that controls both electrode actuation and fluid flow (pump) is built. A simple user interface is designed for control of both fluid flow and electrode actuation, which makes use of a software that can automate droplet generation with flow feedback. A flowchart showing software and hardware integration is shown in FIG. 6 and an image of the interface is shown in FIG. 23.

In some embodiments, droplets can be recovered from the device, such as but not limited to using capillaries, PTFE membranes or the like.

Example 1: Mammalian Single-Cell Sorting and Recovery

The presently disclosed devices may be used in several applications, including single cell viability assays, single cell drug inhibition assays, clonal isolation and single cell transfections or gene editing experiments.

In one example, transfected NCI-H1299 lung squamous cell carcinoma heterozygous populations were trapped, encapsulated, screened and sorted using the device herein described.

Following the traditional transfection pipeline as shown in FIG. 9, an NCI-H1299 lung squamous cell carcinoma cell line was selected as the cell line of interest This cell line has been previously engineered to express green fluorescent protein (GFP). The objective was to knock out this enhanced green fluorescent protein (eGFP) as a proof of principle, or knocking out the RAF1 gene, a gene involved in the RAF1 kinase cancer pathway. Cells were transfected with plasmids expressing a Cas9 targeting these genes, and heterogeneous population were obtained. Transfection could be shown by expression of mCherry. The cell population was then trapped using the microfluidic device herein described. Isoclones of interest were encapsulated and a single isoclone was released at a time and recovered in a 96 well format.

To study the sorting spectrum of the microfluidic device, one gene delivery method off chip was performed which had high viability but low efficiency (lipofection). A strategy to deliver a plasmid encoding for Cas9, mCherry, and guide RNA targeting either RAF1 oncogene or the eGFP cassette in the H1299 cell line was selected. The efficiency of transfection was measured by adding a red fluorescent protein, mCherry on to the plasmid for gene delivery. The fraction of mCherry expressing cells was then studied by microscopy or FACS. As shown in FIG. 10, electroporation was more efficient compared to lipofection in terms of transfection, with transfection lower than 10%. For the electroporated population, a knockout experiment of eGFP was performed. As mentioned above, this cell line had been previously modified to contain an eGFP cassette. A Cas9 system was designed to cut the eGFP gene at its 314 bp, resulting in eGFP knockout which can be seen after 10 days of culture.

The experimental procedure using the microfluidic device can be summarized as follows:

Prime step: The microfluidic device was first primed with a surfactant, to treat the channel walls to avoid cells from sticking to it (FIG. 11).

Trap step: The heterogeneous cell population was loaded onto the microfluidic device and single isoclones were trapped (FIG. 12). Referring to FIG. 13, two single H1299 isoclones, one of which expressing only eGFP (see middle panel), the bottom one also expressing mCherry (see right panel), indicating successful uptake of the plasmid.

Encapsulate step: The single isoclones were then encapsulated (FIG. 14).

Sort step: After selection of isoclones of interest, a droplet containing the cell was released forward toward the outlet, using the GUI (FIG. 15).

Recover step: The single isoclone contained in a droplet was absorbed in a capillary attached to the outlet. The contents can be flushed out in a PCR tube, centrifuged to break the droplet, and recovered in a media containing 96 well plate (FIGS. 16 and 17). A viable single isoclone may be obtained, showing successful growth an expansion as tracked over 5 days (see right images of FIG. 17).

The contents can also be flushed out in a recipient like a PCR or Eppendorf tube. The emulsion can be destabilized by either centrifugation, or by using a chemical method. The droplet content (single-cell) will be located in the aqueous phase, which can be recovered in a media containing recipient for cell culture, such as a 96 well plate (FIGS. 16 and 17). A viable single isoclone was obtained, showing successful growth an expansion as tracked over 5 days (see right images of FIG. 17).

Example 2: Hybrid Microfluidic Mammalian Single-Cell Isolation

In at least one embodiment, a hybrid microfluidic platform that provides for precise control of droplets in channels and deterministic single cell encapsulation is also described herein. Compared to traditional methods, the hybrid microfluidic platform provides a wide sorting spectrum that can use small cell populations, with a low fraction of edited cells to sort. In at least one embodiment, using the software may also provide for shortening and simplifying the mammalian gene-editing pipeline.

FIG. 24A shows a representative device used for single-cell trapping, single-cell droplet generation and droplet operations according to at least one embodiment. As shown in FIG. 24A, the microfluidic device comprises three layers: a patterned electrode layer, a 7 μm SU-8 5 dielectric layer and a PDMS-based channel layer of 35 μm height and a main channel width of 50 μm. The 'hybrid' integrated droplet digital microfluidic device is comprised of a bottom digital microfluidic layer (i.e. electrodes and dielectric) along with a top patterned channel layer in which cells are trapped (single-phase) or droplets are manipulated in an oil phase (two-phase).

The device shown in FIG. 24A is divided into two sections: an on-demand T-junction droplet generator (see FIG. 24B) and a single-cell droplet array (see FIG. 24C). As shown in FIG. 24B, the on-demand droplet generation comprises co-planar electrodes that will actuate the aqueous flow (using electric potentials) to the orthogonal continuous oil flow that will break the continuous aqueous flow into discretized droplets. The single-cell droplet array (see FIG. 24C) can trap single cells, after which they are encapsulated in droplets that are generated within the traps by the application of an electric field. It contains 12 traps, of which six are equipped with electrodes. Tubing connects the two parts of the device to transfer the droplets from the droplet generator to the single analysis part of the device. The device contains two inlets—I1 for oil and droplets and I2 for cells and priming—and two outlets—O1 for waste and 2 for sample recovery and flow reversal (see FIGS. 25A and 25B).

In the system shown in FIG. 24A, at least one design element needs to be considered for reliable cell trapping and encapsulation. Two commonly used methods for single cell isolation—trapping and encapsulation—are used complementarily. In this example, the traps of the single cell analysis array are designed such that they could trap single cells with high efficiencies, yet also allow for a smooth phase change to a two-phase flow. Resistance-based design guidelines were followed (as reported) for microfluidic serpentine trap designs for droplets and cells. The location of each of the traps relative to the main channel is an important consideration to provide for both single-cell trapping and phase change to occur. By modelling flowrate profile and velocity streamlines, the channel geometry was configured (see FIGS. 26A and 26B), such that volumetric flow rate through the trap ($Q_{trap}$) is greater than volumetric flow rate through the bypass channel ($Q_{bypass}$) when there is no cell in the trap.

It was determined that positioning the trap near the curvature of the main channel (i.e. the end of a serpentine channel) and providing a narrow (e.g. ~50 μm width) trap entrance and a narrow (e.g. ~50 μm) width of the main channel immediately after the trap opening, inhibited cells bypassing the empty traps. This placement also offered a higher effective hydrodynamic resistance in the bypass channel ($R_{bypass}$) than through the trap ($R_{trap}$). Hence, the flowrate in the trap was higher compared to the bypass channel ($Q_{trap} > Q_{bypass}$) to maintain the same pressure drop.

Furthermore, the device of FIG. 24A offers two additional advantages: (1) if a cell is trapped, it is unlikely for another cell to flow into the same trap since this increases the $R_{trap}$ (and reduces $Q_{trap}$) and (2) during a phase change for single-cell encapsulation (trap based droplet generation) (described below), the resistance in the trap is sufficiently higher than the resistance in the bypass channel which helps inhibiting squeezing the cells out of their traps. A mathematical description and the simulation details are described below.

Optimizing single-cell trapping and encapsulation was done by designing the channel microfluidics device following hydrodynamic resistance ($R_h$) [1] and using streamline based design rules [2].

$\Delta P = R_h$, with $R_h$ the hydrodynamic resistance, $Q$ the volumetric flow rate and $\Delta P$ the pressure drop in the channel. The hydrodynamic resistance can be described as follows:

$$R_h = \frac{12\mu L}{wh^3\left(1 - 0.63\dfrac{h}{w}\right)}$$

where there are three hydraulic resistances: the trap constriction $R_2$, the trap $R_3$, and the bypass channel $R_1$ (see FIG. 26A).

Determining the width of the opening of the trap, the depth of the trap, the height of the channel, and the length of the bypass, the three resistances can be calculated. Before the cells are loaded, it is desired for $R_2 + R_3 > R_1$, to encourage cell trapping. When a cell is trapped, it is desired that $R_2 + R_3 \leq R_1$ to encourage $Q_1 > Q_{2+3}$ (or $Q_{bypass} > Q_{trap}$) while taking into account $R_3$ increases when a cell is trapped. Taking this into account, the velocity streamline profile was reviewed and the trap was positioned near the curvature of the main channel (i.e. the end of a serpentine channel) along with narrowing the width of channel near trap to improve cell trapping.

For the electrode design, four electrodes were sufficient to perform desired operations. A common ground electrode wire going through the center of the trap was chosen to act as a ground in case all four electrodes receive a potential. Interdigitation was used and electrodes have a minimum gap of 14 μm. The wiring has a thickness of 20 μm. The wiring density through channels is minimized, as actuations through wiring can manipulate the flow. This limited us to only equip 6 out of 12 traps with 4 electrodes each.

The model portraying the channel geometry with flow velocity profile, velocity streamlines and pressure was stationary simulated using COMSOL Multiphysics 2D creeping flow physics. Inertia and turbulence were neglected, and no slip was set for channel walls. The fluid within the channels was PBS, the boundaries were PDMS. Conditions used for modeling were:

P=0 Pa for outlet pressure $$u = \begin{cases} x = 0 \\ y = 0 \end{cases} ms^{-1} \text{ for initial velocity profile}$$

$V_0 = 0.0008 \mu Ls^{-1}$ for volumetric laminar inflow

The model portraying the electric field generated by different actuation patterns, was simulated in COMSOL Multiphysics with a static electricity module (Supplementary FIG. 6). Electrodes were modeled as 2D surfaces without thickness, under a 7 µm SU-8 surface, covered with an HFE oil of 30 µm thickness (FIG. 1). The top PDMS features on the device were omitted from the simulation.

Conditions used for modeling the electric field above the dielectric:

T=293.15 K is the temperature

As potential $V_0$:

1.8 $V_{pp}$=142$V_{RMS}$ for droplet generation 1.6 $V_{pp}$=126 $V_{RMS}$ for droplet release, keep and encapsulate And with ground potential and initial potential V=0 V The model was static, stationary and materials were continuous. For each model, the not actuated electrodes were selected as ground.

Under static conditions, the electric potential, V, is defined by the relationship $$E = -\nabla V$$

and the electric displacement or flux density D is defined by the relationship $$D = \varepsilon_0 E + P$$

with the electric constant $\varepsilon_0$, electric field E, and P. Following Gauss' Law:

$$-\nabla (\varepsilon_0 \nabla V - P) = \rho$$

With electric field E, tangential to the xy-plane (3D) this becomes:

$$-\nabla d(\nabla V - P) = \rho$$

with d and ρ the total electric charge density.

In COMSOL, the magnitude of the electric vector field (V m$^{-1}$) is calculated with:

$$E = \sqrt{E_x^2 + E_y^2 + E_z^2}$$

TABLE 1

| Parameters for multi-physics modeling | |
|---|---|
| Property | Value |
| SU8-5 Relative Permittivity | 4.5 |
| PDMS Relative permittivity | 2.75 |
| PDMS density | 970 [kg m$^{-3}$] |
| PBS density | 1000 [kg m$^{-3}$] |
| PBS dynamic viscosity | 0.0008882 [Pa s] |
| HFE 7500 oil relative permittivity | 5.8 |
| HFE 7500 oil boundary size | 500 × 500 [µm$^2$] |
| Dielectric thickness SU-8 5 | 7.0 [µm] |
| SU-8 5 boundary size | 500 × 500 [µm$^2$] |
| Electrode sizes | 110 × 110 and 110 × 40 [µm$^2$] |
| Ground electrode size | 10 [µm] |
| Electrode gap width | 14 [µm] |

Finally, it should be noted that one of the main goals of this work was to automate the process of actuation and droplet manipulation, but a key challenge is to integrate and to control the multiple pieces of hardware into one software framework. In the embodiment shown in FIG. 24A, the microfluidic device was connected to two main hardware components: the in-house automation system (i.e. optical switches) and a syringe pump system (see FIGS. 27A and 27B).

The microfluidics device was placed inside a 3D printed pogo pin PCB board holder of which the base plate fit on the stage of an inverted microscope (Olympus IX7) [3]. The flow was observed under a 4× or 10× objective under bright-field illumination. A NeMESYS Low Pressure pump (Cetoni) with five syringe units, and an Arduino Uno were connected to a PC, and operated through Python 2.7. The Arduino Uno was connected to a stack of 120 optocouplers, powered by a 5 $V_{DC}$ power supply. A 15 kHz sinusoidal signal (function generator), was amplified. The Python protocol was run and the GUI was started after which flows are started with disconnected tubing to remove air bubbles in the system. Tubing was carefully connected to the device (see FIGS. 27A and 27B).

When the tubing was inserted into the device, high flow rates (~500 nL s-1) were to be used in order to avoid air bubbles within the inlets. Priming was done from inlet 1 with PBS containing 2% Pluronics F-127, filled in a 500 µL gastight syringe. After the device was primed (for at least 5 min), the priming solution was moved from the inlet to outlet and turned to a lower flowrate (~1 nL s-1). Cells were loaded from inlet 1, either re-suspended in PBS or their original media, and placed in a 2.5 ml syringe with a 7 mm magnetic stirring disk. The syringe was stirred continuously throughout the procedure. Once cells entered the device, and leaving through inlet 2, the flow of the priming solution can be stopped and cells will enter the trapping array. Phase change for single-cell encapsulation was performed using HFE 7500 with 2% fluorosurfactant arriving from the droplet generator with inlet 4 connected to a 500 µL syringe. Inlet 3 was connected to a 500 µL syringe with an aqueous solution (droplet content). Outlet 3 was connected to Inlet 2 with PEEK tubing, after all air has been pushed out the droplet bridge. Electrodes were actuated using the GUI. Once the cells were encapsulated, additional droplets were generated on-demand using the GUI, by using HFE 7500 with 2% fluorosurfactant at Inlet 4 with varying flow rates, and aqueous flow from Inlet 3 at 0.6 nL s-1. Outlets can be blocked using PEEK tubing with glued ends, if desired.

The automation system served the purpose to provide electrode actuation and the syringe pump system controlled the flow rates in the device. Since these two hardware systems were operating on different software protocols, a Python based framework was developed with a user interface for one-click droplet operations. The software is available at: http://bitbucket.org/shihmicrolab.

Hydrodynamic Single-Cell Trapping and Deterministic Single-Cell Encapsulation through In Situ Droplet Generation FIGS. 28A to 28C illustrate the optimized device operation procedures for trapping single cells and encapsulating the cells inside droplets using the 'hybrid'-based microfluidics platform noted above. As detailed above, the device operation procedure comprises priming, cell loading, phase change, and encapsulation followed by droplet release. The procedure for trapping and in situ (i.e. within the microfluidic device) encapsulation is represented as a schematic in FIG. 29.

First, devices were primed with 2% Pluronics F-127 for at least 5 min to decrease cell adhesion to PDMS. Second, an aqueous flow containing fresh media with mammalian cells (MCF-7 breast cancer cell line) was introduced into the trapping device at a concentration of about 105-106 cells mL-1 (see FIG. 28A for an image of six individually trapped cells). The efficiency of cell trapping as a function of flow rate was evaluated. Using this design, the optimal range of flow rates to trap individual cells was between 1-4 nL s-1 (FIG. 28B). At this range of flow rates, cells were unlikely to occupy traps with multiple cells and the MCF-7 cells do not squeeze through the traps (unlike at high flow rates). Single cells were most efficiently trapped (~88.3%) at 5 nL s-1—an efficiency similar to previous studies which required displacement structures or other external forces to trap cells. Over 54 consecutive events (out of 54 observations) of MCF-7 cells passing by a single MCF-7 cell occupied trap were encountered, without trapping a second one. The conditions defining the success at these flowrates are (1) the optimized channel flow velocity profile and slanted overhang along the main channel (close to the trapping region) to steer the flow towards the trap (2) designing a 8 μm constriction which is smaller than the cell size, and (3) the physical properties of MCF-7 cells (i.e. lower deformability).

Following the trapping of the cells is the generation of a droplet within a trap which results in the encapsulation of a single cell inside a droplet. Popular passive single-cell encapsulation is known to be a procedure that follows Poisson statistics, generating droplets with none, one or more cells. Using the hybrid device described above, a droplet could be generated in situ (i.e. within the trapping array), and thus deterministically encapsulated the trapped cell. This was done by moving from a single-phase flow to a two-phase flow using a phase change procedure by: (1) flowing an oil phase through the entire channel and, and (2) applying an electric potential to the electrodes below the trap when the oil flow approaches.

FIG. 28C shows three images taken from video frames showing the on-demand, in situ droplet generation process. Four coplanar electrodes (size=~100 μm, area 0.06 mm$^2$) were used for the generation event—two electrodes below the main channel and two electrodes below the trap. In Frame I, all electrodes were grounded. An oil flow entered the main channel for the purpose of a phase change. In Frame II, the electrode below the trap was activated while the other electrodes were grounded. The aqueous phase and the single-cell remained inside the trap when the oil flow (in the main channel) "cut" the aqueous phase at both ends of the trap. Generated cell containing droplets were on average 150.3±5.6 pL in volume (N=11). In Frame III, all potentials were grounded, and the oil phase flow continued to the next trap to perform the next encapsulation procedure. To aid the design of the trap and to determine the optimal actuation sequence, the electric potential and electric field distributions were simulated (see FIGS. 30 and 31). As shown, the electric field density (~5×106 V m$^{-1}$) was induced between the main channel and the trapping region. This field gradient induced an electrostatic force that pulls the liquid towards the trap (similar to digital microfluidic droplet actuation). Given this capability, the device has means to encapsulate cells in droplets on-demand without Poisson-based statistics. The details of the simulation are described in Table 1, above.

The success of trapping and encapsulation was dependent on device fabrication and operation methods. For example, the reliability of electrode actuations and resulting droplet operations depended on the alignment of the electrodes and channels. To minimize the strenuous task of alignment, the ground wire and the gap between electrodes was used to serve as an alignment mark. Since these are clear marks, alignment could be performed swiftly under a microscope without losing the oxygen plasma treatment on the PDMS. Furthermore the device was divided into two components (a droplet generator and a serpentine trapping channel) to fit the features within the view field of the microscope, and to minimize PDMS shrinkage. The process of inserting and removing tubing from the inlets and outlets also required slow manipulation. Air bubbles were most likely to occur while changing from priming solution to cell solution and when initiating the oil flow, as the bubbles can block flow inside traps, can push cells out of their traps or disturb the stability flow causing diverging flowrates. The air bubbles can also cause unwanted pressure differences inside the channel, which may lead to droplet breakup and movement. One solution was to insert the tubing gently at high flowrates and use a small diameter tubing to connect the droplet generation and trapping devices.

Specifically, Novec 1720 contains a fluorosilane polymer surfactant dissolved in an ether solution. It is volatile solvent and ideal to avoid remaining surfactant clogs in the traps [4]. This solvent swells PDMS, and care should be taken to follow this procedure accordingly. Clean PDMS channel slabs were treated with oxygen plasma for 30 s and directly aligned on top of a clean dielectric coated electrode patterned glass, under a microscope (4×). The device was sealed with transparent adhesive tape and pressure was applied. Immediately, the device channels were treated for 20 min with Novec 1720 and dry for 20 min at room temperature. The device was then baked at 150° C. for 30 min, while applying 750 g weight on the device.

For the droplet bridge, a 2 cm piece of PEEK tubing was treated with Novec 1720 for 20 min by flowing it through.

To reuse devices, the device can be flushed with Fluorinert FC-40 to remove oil containing surfactant in the traps, and then baked at 100° C. for 2 h. If actuations took place, the device can be washed with FC-40 and treated with Novec 1720 as described above. Chips not used for 14 days can be treated again with Novec 1720. If needed, chips can be washed with a 1% Triton X-100 solution to flush out debris, and then continue with an FC-40 wash.

Lastly, it was important to perform a thorough cleaning of the traps by removing the remaining oil emulsions in the 8

μm trap constrictions to ensure high cell trapping efficiency for the next set of trapping experiments.

Two-Phase On-Demand Droplet Operations: Droplet Generation, Releasing and Keeping of Droplets in Traps After trapping and phase change, other droplet operations such as droplet generation or keeping and releasing the droplets containing single cells were investigated. Generally, in droplet-based microfluidic devices, controlling droplet positions inside the channels is performed by using passive structures, valves, or external forces (optical, acoustic, dielectrophoresis). For example, others have used serpentine channels containing droplet traps under forward flow to trap droplets and use reverse flow to hydrodynamically release droplets. The platforms presented here can perform multiple droplet operations, such as a trapping operation under forward flow, release operation under forward/reverse flow, and keep operation under reverse flow. Further, the devices descried herein have no additional channel structures that have been fabricated to guide cells and there is no reliance on timing the droplet flow to control the droplets as required by previous works. The main contributor to controlling the droplets in the devices described herein is the application of electric potentials to the electrodes (similar to digital microfluidic systems) such that the above-mentioned operations can be performed with high fidelity.

To characterize releasing operations, the likelihood for droplet release at different flow rates (for the forward and reverse flow directions) was tested using electric potential or via pressure-driven flow. FIG. 32A (Frames I-IV) shows the actuation sequence for releasing a droplet under forward flow. The droplet was released by actuating electrodes below the trap (Frame II) followed by activating an electrode below the main channel and the trap (Frame III). By using this specific sequence, the electric field density directed the droplet from the trap towards the main channel in the direction of the flow (see FIG. 31). The likelihood for droplet release at different flow rates in forward direction (from inlets to outlets) was also tested. The results are provided in FIG. 32B. As shown, low forward flow rates (<1 nLs-1) gave rise to high probability (>95%) of being able to release the droplet. Since droplets were trapped due to the hydrodynamic pressure, $P_h$, of the oil flow and the droplet was controlled by using electrostatic forces (Felec), droplets could be released when the electrostatic force $F_{elec}$ was greater than the $P_h$ generated by the flow in the main channel. This relationship held true when there was no flow rate applied. In this case, the droplet was released from the trap but was static at the entrance of the trap since there was no flow. While without any electrostatic force (i.e. no electric field applied) at any given flow rate, the droplet was not released from the trap.

Next, the likelihood of releasing droplets with reverse oil flow was tested, with and without on-demand actuation. As shown in FIG. 32C (Frames I-IV), the actuation sequence under reverse flow (from outlets to inlets) was similar to the actuation sequence for the droplet release under forward flow. In contrast to with forward flow, the probability of releasing a droplet was most likely to occur at higher flow rates (>10.92 nL s-1) (without actuation; hydrodynamic flow only). The lower flow rates were more likely to keep the droplet inside the trap (see FIG. 32D)—a similar trend observed in other studies. When actuation was implemented, the droplet could be released from the trap at any time and there was no dependence on the reverse flow rate using a specific actuation pattern. This was an exciting result since it enables the user to release and to select droplets on-demand and in parallel without the need for dielectrophoretic, acoustic or magnetic sorting techniques. This may be a significant advance over other droplet-based microfluidic systems that implement trapping and releasing droplets.

In some cases keeping droplets inside a trap was also a desired operation. FIG. 32E shows the actuation sequence for keeping a droplet. Four electrodes were activated to ensure the highest electric field density was centred at the opening of the trap to prevent the droplet from escaping into the main channel (see FIG. 31). The likelihood of the droplet being released when different flow rates were applied from the narrow to the wider region of the trap showed flow rates below about 45.4 nL s-1 gave rise to high probability on keeping the droplet (>95% logistic regression model asymptote) (N=10) (FIG. 32D). The main reason for this trend was that after a certain flow rate, $P_h$>$F_{elec}$. However, if the flowrate decreased, droplets resided for a longer period within the main channel, which can be disadvantageous for fast sorting procedures (see FIG. 33). It was possible to increase the applied potential (>126 VRMS) to the electrodes (to increase the electrostatic force and work under higher flow rates), but this may induce dielectric breakdown, followed by electrolysis or Joule heating which can ultimately lead to cell stress and to changes in genomic regulation in cells. Hence, for the gene-editing experiments discussed below, flow rates below 45 nL s-1 were used to keep the droplets inside the trap while maintaining applied potentials below 126 VRMS.

Droplets were generated on-demand to have the capability to add reagents to other droplets in the device. An automated replenishment of the aqueous flow was provided, which removed the limit on the number of droplets that can be generated. Using this droplet generator, droplets were generated on-demand using a T-junction configuration with oil flow rates between about 2 to about 2.5 nL s$^{-1}$ (see FIGS. 34A and 34B). At lower flow rates than 2.0 nL s$^{-1}$, on-demand droplet generation became difficult due to the inability of the oil flow to shear off a droplet, while at higher flow rates than 2.5 nL s$^{-1}$ the pressure of the oil flow was larger than the electrostatic force removing the force balance at the interface to generate droplets. After droplet generation, the capacity for the device to merge droplets was also shown.

As shown in FIG. 35, merging incoming droplets with trapped droplets on demand was possible. An advantage of on-demand merging is that it does not rely on the tedious synchronization of two streams of droplets for droplet coalescence nor does it require any pressurized channel. Generating droplets on-demand with a T-junction and generating single-cell containing droplets by phase change, showed high monodispersity (250.9±39 pL and 150.3±55.6 pL respectively) (FIG. 35).

Effects of Electrical Potential on Cell Viability

Droplet-based microfluidic platforms typically use short pulses of electric potentials to either sort droplets or manipulate droplets on an array of electrodes. In these platforms, a droplet containing a biological cell experience a negligible electrical field and therefore their viability is maintained. The effects of electrode actuation on cells in single-phase fluid, before cells were encapsulated, was also investigated. This was representative of electrode actuation for single-cell encapsulation. After priming the device and trapping the single MCF-7 cells, a viability assay was performed by flowing a solution of fluorescein diacetate (lex: 490 nm, lem: 526 nm) and propidium iodide (lex: 488 nm, lem: 617 nm) through the channel labelling live and dead cells respectively. The viability of voltage-potentiated and non-potentiated cells immediately after 30 s application of an AC electric potential was compared. As FIG. 36A illustrates, the single cells were generally viable (shown in green) after being exposed to electric fields on the hybrid device compared to non-exposed cells. There was no significant difference between the cells directly exposed to the potentials and non-potentiated cells (FIG. 36B; P=0.6687). A small loss of viability (~18%) was observed in the potentiated cells and a similar viability (87.5±7.2%) was observed in the non-potentiated cells. The reduction in viability may be attributed to the pre-processing sample handling procedures outside their native cell culture environment—e.g., cell sample preparation in the syringe. Regardless of the reasons for the loss, these initial results for viability suggest that actuating electrodes in the hybrid device does not significantly alter the cell viability (>80%) and is suitable for isoclonal procedures (described below).

Recovery and Expansion of Single-Cell Isoclones from a Heterogeneous Engineered Cell Population To illustrate that the hybrid platform described herein is suitable for single cell isoclonal sorting, a gene-editing workflow was followed to isolate the engineered cell from a heterogeneous cell population of an NCI-H1299 lung squamous cell carcinoma cell line. As shown in FIG. 37A, two plasmids containing Cas9 and a sgRNA, targeting either the eGFP or the RAF1 gene were used for transient lipid based transfection. The transfection efficiency for each knockout experiment was evaluated and a ~25.3% and a ~13.7% efficiency for eGFP and RAF1, respectively, was observed (FIG. 37B and FIG. 38). Knockout efficiencies were determined by a genomic cleavage detection assay and were calculated to be 4.95% and 8.3% for eGFP and RAF1 respectively (FIG. 37C). Since a heterozygous population (see FIGS. 39A, 39B and 39C) was obtained, this called for a precise mechanism to sort and to isolate the low population of successful clones. Hence, for this part of the workflow, the hybrid device was used by trapping the cells in the device such that they could be imaged by fluorescence microscopy to determine which cells have been transfected (mCherry expression) (FIG. 37D and FIG. 40). Given the low number of successful clones, only 1 out of 6 traps contained a successful transfected cell (~16.7%) (FIG. 37E). Indeed, there are times when the traps did not fill with a transfected clone, however, with fine-tuned control and automation, the system can increase the flow rate in the forward direction which enabled the cells to squeeze through the traps such that a new cell can be trapped. This is one of the key capabilities of this device—trapping and releasing of isoclonal cells can be performed iteratively. In merely 45 minutes (instead of hours), isoclones can be trapped, encapsulated and sorted since (1) there is no requirement for iterative sample preparation or (2) isolation of a clonal cell line by limited dilution or other time-consuming techniques such as FACS is no longer needed.

After encapsulation of a successful isoclone, on-demand forward release of a single-isoclone in a droplet was performed to recover the isoclone (FIG. 37F). Expansion is a key step for the development of a new clonal cell line. After droplet sorting in microfluidic devices, the droplets were recovered by directly flowing them into a different substrate for the recovery of cells using a chemical emulsion breaking method, centrifugal methods, or automated dispensing methods. As these methods are performed on emulsion of multiple droplets, we were unsuccessful at using these techniques to recover only the content of a single drop. The deterministic encapsulation and on-demand release of droplets in our platform provided for the development of a method to recover the content of a single droplet from a water-in-oil microfluidic emulsion into a single well of a 96-well plate (see FIGS. 41A and 41B). Following an on-demand forward release of a single isoclone, a method was used that included transferring the droplet into a capillary and onto a hydrophobic PTFE membrane (see FIGS. 41A and 41B). The oleophilic membrane absorbed the HFE 7500 oil, removing the surrounding oil around the aqueous droplet. The emulsions were washed with FC-40 oil to remove excess HFE and surfactants and to release the isoclone into a media droplet, which was subsequently transferred to a 96-well plate. FIG. 37G shows images of the eGFP knockout isoclonal cells being expanded in a 96 well plate format.

The results described above demonstrate that hybrid-based microfluidics can be used to expedite the gene-editing workflow with very high performance and efficiency. With efficient trapping, encapsulation, releasing, recovery, and expansion procedures, hybrid microfluidic devices outperform the standard FACS and limited dilution assays for isolating single clones. These data presented here gives researchers interested in gene-editing the ability to establish monoclonal lines from heterozygous transfected populations, without the excessive manual handling steps required for selection, sorting, dilution, and clonal selection. In continuing work, we are using these devices (or derivative thereof) for low-transfection cell lines, which should highlight the advantages further by application to engineering cellular-based therapies.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

[1] M. Zimmermann, H. Schmid, P. Hunziker, E. Delamarche, *Lab Chip* 2006, 7, 119.
[2] E. Brouzes, M. Medkova, N. Savenelli, D. Marran, M. Twardowski, J. B. Hutchison, J. M. Rothberg, D. R. Link, N. Perrimon, M. L. Samuels, *PNAS* 2009, 106, 14195.
[3] F. Ahmadi, K. Samlali, P. Q. N. Vo, S. C. C. Shih, *Lab Chip* 2019, 19, 524.
[4] M. Sauzade, E. Brouzes, *Lab Chip* 2017, 17, 2186.

What is claimed is:

1. A method of employing a microfluidic device to trap a cell and perform droplet operations associated with the trapped cell, the method comprising:

providing the microfluidic device, wherein the microfluidic device comprises:

a first layer having a plurality of electrodes formed thereon;

a second layer having an elongate channel defined therein;

an intermediate dielectric layer residing between the first layer and the second layer; and a cell trap formed in the second layer, the cell trap extending laterally from a first region of the elongate channel to a second region of the elongate channel that is longitudinally separated, along the elongate channel, from the first region of the elongate channel, the cell trap having a first side in fluid communication with the first region of the elongate channel, the first side being sized to permit entry of the cell into the cell trap, the cell trap having a second side in fluid communication with the second region of the elongate channel, the second side being sized to prevent passage of the cell from the cell trap into the second region of the elongate channel;

the plurality of electrodes comprising a plurality of cell trap electrodes residing proximal to the cell trap;

the elongate channel and the cell trap being dimensioned to produce a hydrodynamic resistance through the cell trap, prior to trapping of the cell, that is less than a hydrodynamic resistance through a longitudinal portion of the elongate channel residing between the first region and the second region, to promote fluid flow through the cell trap to facilitate trapping of the cell within the cell trap;

flowing a first fluid through the elongate channel, the first fluid being an aqueous cell suspension comprising the cell, the first fluid flowing through the elongate channel in a direction such that: the first region is encountered prior to the second region, the cell passes from the first region of the elongate channel into the cell trap due to the hydrodynamic resistance, and the cell is trapped by the cell trap;

after trapping the cell within the cell trap, flowing a second fluid through the elongate channel, the second fluid being immiscible with the aqueous phase of the aqueous cell suspension;

as the second fluid reaches the first region of the elongate channel, actuating at least a first subset of the cell trap electrodes to maintain the first fluid and the cell within the cell trap and form a first aqueous droplet within the cell trap, the first aqueous droplet encapsulating the cell;

flowing a second aqueous droplet through the elongate channel; and as the second aqueous droplet reaches the first region of the elongate channel, actuating at least a second subset of the cell trap electrodes to merge, within the cell trap, at least a portion of the second aqueous droplet with the first aqueous droplet to generate a merged aqueous droplet within the cell trap.

2. The method according to claim 1, wherein the first aqueous droplet encapsulating the cell is formed within the cell trap by actuating the cell trap electrodes to generate an electric field distribution having a maximum value within the cell trap, the electric field density being sufficient to retain a portion of the first fluid within the cell trap as the second fluid flows through the first region of the elongate channel.

3. The method according to claim 1, wherein the first aqueous droplet encapsulating the cell is maintained within the cell trap by actuating the cell trap electrodes to generate an electric field distribution having a maximum value proximal to the first side of the cell trap to prevent the first aqueous droplet from escaping into the first region of the elongate channel.

4. The method according to claim 1, wherein the second aqueous droplet is merged with the first aqueous droplet in the cell trap by actuating the cell trap electrodes to generate an electric field distribution that extends from the first region of the elongate channel into the cell trap in a direction of fluid flow, the electric field distribution facilitating transport of the second aqueous droplet into the cell trap.

5. The method according to claim 1, wherein a flow rate of the second fluid within the elongate channel, while actuating at least a subset of the cell trap electrodes to maintain the first aqueous droplet with the cell trap, is less than 45 nanoliters per second.

6. The method according to claim 1, further comprising actuating at least a subset of the cell trap electrodes to release the merged aqueous droplet from the cell trap into the second fluid.

7. The method according to claim 6, wherein the merged aqueous droplet is released from the cell trap under forward fluid flow and the second region is downstream from the first region.

8. The method according to claim 6, wherein the merged aqueous droplet is released from the cell trap under reverse fluid flow and the first region is downstream from the second region.

9. The method according to claim 6, wherein the merged aqueous droplet is released from the cell trap by actuating the cell trap electrodes to generate an electric field density extending from the cell trap towards the first region of the elongate channel in a direction of fluid flow, the electric field density facilitating transport of the merged aqueous droplet from the cell trap into the first region of the elongate channel.

10. The method according to claim 1, further comprising employing an optical microscope to monitor one or more of: trapping of the cell within the cell trap, and merging of the first aqueous droplet with the second aqueous droplet.

11. The method according to claim 1, further comprising employing an automation control system to automate actuation of the cell trap electrodes and droplet manipulation, the automation control system comprising a microcontroller, wherein the microcontroller is operatively coupled to the cell trap electrodes, and wherein the microcontroller is operatively coupled to a droplet monitoring means.

12. The method according to claim 11, wherein the automation control system further comprises at least one pump interfaced with the microcontroller, the at least one pump being controlled by the microcontroller to automate delivery of at least one of the first fluid, the second fluid, and the second aqueous droplet.

13. The method according to claim 11, wherein the droplet monitoring means comprises an imaging optical microscope.

14. The method according to claim 11, wherein the droplet monitoring means comprises an electrical impedance detection subsystem.

15. The method according to claim 1, further comprising employing a digital microfluidic based droplet generator to generate the first and second aqueous droplet.

16. The method according to claim 15, wherein the digital microfluidic based droplet generator is integrated with the microfluidic device.

17. The method according to claim 1, wherein the merged aqueous droplet is a first merged aqueous droplet, the method further comprising:

flowing a third aqueous droplet through the elongate channel to the cell trap, the third aqueous droplet comprising an assay reagent; and actuating at least a subset of the cell trap electrodes to merge the third aqueous droplet with the first merged aqueous droplet and transform the first merged aqueous droplet into a second merged droplet; and employing an optical microscope to detect an assay signal associated with the assay reagent.

18. The method according to claim 1, wherein the microfluidic device is employed for one or both of gene editing and single cell transfection.

* * * * *